United States Patent
Veloso et al.

(10) Patent No.: US 12,541,828 B2
(45) Date of Patent: Feb. 3, 2026

(54) METHOD AND SYSTEM FOR FORECASTING TIME SERIES BY IMAGE INPAINTING

(71) Applicant: JPMorgan Chase Bank, N.A., New York, NY (US)

(72) Inventors: Manuela Veloso, New York, NY (US); Zhen Zeng, Ypsilanti, MI (US); Naftali Y Cohen, New York, NY (US); Srijan Sood, New York, NY (US); Jacob Reinier Maat, Boston, MA (US); Tucker Richard Balch, Suwanee, GA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 589 days.

(21) Appl. No.: 17/901,083

(22) Filed: Sep. 1, 2022

(65) Prior Publication Data
US 2024/0078644 A1   Mar. 7, 2024

(51) Int. Cl.
*G06T 5/77* (2024.01)
*G06T 5/50* (2006.01)
*G06V 10/774* (2022.01)

(52) U.S. Cl.
CPC .............. *G06T 5/77* (2024.01); *G06T 5/50* (2013.01); *G06V 10/774* (2022.01)

(58) Field of Classification Search
CPC ............ G06T 5/77; G06T 5/50; G06V 10/774
USPC ......................................................... 382/275
See application file for complete search history.

(56) References Cited

PUBLICATIONS

Maaroufi, Nadir, Mehdi Najib, and Mohamed Bakhouya. "Predicting the Future is like Completing a Painting!." arXiv preprint arXiv:2011.04750 (2020). (Year: 2020).*
Cohen, Naftali, et al. "Visual forecasting of time series with image-to-image regression." arXiv e-prints (2020): arXiv-2011. (Year: 2020).*
Liu Y, Dutta S, Kong AW, Yeo CK. An image inpainting approach to short-term load forecasting. IEEE Transactions on Power Systems. Mar. 15, 2022;38(1):177-87. (Year: 2022).*
Durall, Ricard, Franz-Josef Pfreundt, and Janis Keuper. "Local facial attribute transfer through inpainting." 2020 25th International Conference on Pattern Recognition (ICPR). IEEE, 2021. (Year: 2020).*
Nguyen, Minh Nhut, et al. "Stock Market Price Prediction using Cyclic Self-Organizing Hierarchical CMAC." 2006 9th International Conference on Control, Automation, Robotics and Vision. IEEE, 2006. (Year: 2006).*

(Continued)

*Primary Examiner* — Jonathan S Lee
(74) *Attorney, Agent, or Firm* — Greenblum & Bernstein, P.L.C.

(57) ABSTRACT

Methods and systems for using images that represent time-series data to forecast corresponding images depicting future values of the time-series data are provided. The method includes: receiving a set of time-series data; converting the set of time-series data into a partial first image that includes a blank region to which future data to be included in the first set of time-series data corresponds; and performing an inpainting operation with respect to the partial first image by generating pixels for filling in the blank region in order to produce an augmented version of the first image. A machine learning algorithm that is trained by using historical time-series data may be used to perform the inpainting operation.

13 Claims, 18 Drawing Sheets

(56) References Cited

PUBLICATIONS

Zeng, Wei, et al. "Modeling spatial nonstationarity via deformable convolutions for deep traffic flow prediction." IEEE Transactions on Knowledge and Data Engineering 35.3 (2021): 2796-2808. (Year: 2021).*

Zhu, Yuelong, et al. "Flood prediction using rainfall-flow pattern in data-sparse watersheds." IEEE Access 8 (2020): 39713-39724. (Year: 2020).*

* cited by examiner

METHOD AND SYSTEM FOR FORECASTING TIME SERIES BY IMAGE INPAINTING

BACKGROUND

1. Field of the Disclosure

This technology generally relates to methods and systems for forecasting time series data, and more particularly to methods and systems for forecasting time series by capturing input data as images and using a model that outputs a visual depiction of the future.

2. Background Information

Time series forecasting methods aim at predicting future values given past observations. Common applications range from uncovering simple periodic patterns to forecasting complex non-linear interactions. The prevailing forecasting techniques include robust and stable approaches such as linear regression, exponential smoothing, and autoregressive integrated moving average (ARIMA). In the most recent 20 years, Machine Learning forecasting approaches such as tree-based algorithms, ensemble methods, simple neural network autoregression, and recurrent neural networks have been introduced. These methods are useful for multivariate, highly nonlinear and inseparable data but are often considered less stable than other approaches.

More recently, deep learning approaches have been applied, as well as unsupervised approaches for pre-training, clustering, and distance calculation. A common theme across these approaches is their use of stacked autoencoders (e.g., vanilla, convolutional, recurrent, etc.) on numeric time series data. Autoencoders have also shown promise in applications such as image denoising and image compression.

SUMMARY

The present disclosure, through one or more of its various aspects, embodiments, and/or specific features or sub-components, provides, inter alia, various systems, servers, devices, methods, media, programs, and platforms for methods and systems for forecasting time series by capturing input data as images and using a model that outputs a visual depiction of the future.

According to an aspect of the present disclosure, a method for using images that represent time-series data to forecast corresponding images depicting future values of the time-series data is provided. The method is implemented by at least one processor. The method includes: receiving, by the at least one processor, a first set of time-series data; converting, by the at least one processor, the first set of time-series data into a partial first image that includes at least one blank region to which future data to be included in the first set of time-series data corresponds; and performing an inpainting operation with respect to the partial first image by generating a plurality of pixels for filling in the at least one blank region in order to produce an augmented version of the first image.

The method may further include: receiving a plurality of training sets of time-series data; converting each respective one of the plurality of training sets of time-series data into a corresponding one of a plurality of training images; and using the plurality of training images in conjunction with the partial first image to perform the inpainting operation.

The method may further include: using the plurality of training images to generate a historical database; using the historical database as an input to a machine learning algorithm; and using the machine learning algorithm in conjunction with the partial first image to perform the inpainting operation.

The method may further include using the augmented first image to generate a second image depicting a plurality of future values that corresponds to a predetermined future time interval with respect to the first set of time-series data.

The method may further include determining, for each respective pixel included in the plurality of pixels, a respective probability that indicates a corresponding uncertainty with respect to an accuracy of the respective pixel.

The generating of the plurality of pixels may include representing, for each respective pixel, the corresponding uncertainty by using a pixel intensity of the respective pixel.

The method may further include generating at least one metric that relates to a forecast accuracy of the augmented first image.

The at least one metric may include at least one from among a Symmetric Mean Absolute Percentage Error (SMAPE) metric, a Mean Absolute Scaled Error (MASE) metric, a Likelihood metric, and an Earth Mover's Distance (EMD) metric.

The first set of time-series data may include at least one from among a synthetic harmonic dataset, a synthetic mean-reverting dataset that is generated by using an Ornstein-Uhlenbeck (OU) process, a set of electrocardiogram (ECG) data, and a set of stock price data.

According to another exemplary embodiment, a computing apparatus for using images that represent time-series data to forecast corresponding images depicting future values of the time-series data is provided. The computing apparatus includes a processor; a memory; and a communication interface coupled to each of the processor and the memory. The processor is configured to: receive, via the communication interface, a first set of time-series data; convert the first set of time-series data into a partial first image that includes at least one blank region to which future data to be included in the first set of time-series data corresponds; and performing an inpainting operation with respect to the partial first image by generating a plurality of pixels for filling in the at least one blank region in order to produce an augmented version of the first image.

The processor may be further configured to: receive, via the communication interface, a plurality of training sets of time-series data; convert each respective one of the plurality of training sets of time-series data into a corresponding one of a plurality of training images; and use the plurality of training images in conjunction with the partial first image to perform the inpainting operation.

The processor may be further configured to: use the plurality of training images to generate a historical database; use the historical database as an input to a machine learning algorithm; and use the machine learning algorithm in conjunction with the partial first image to perform the inpainting operation.

The processor may be further configured to use the augmented first image to generate a second image depicting a plurality of future values that corresponds to a predetermined future time interval with respect to the first set of time-series data.

The processor may be further configured to determine, for each respective pixel included in the plurality of pixels, a respective probability that indicates a corresponding uncertainty with respect to an accuracy of the respective pixel.

The processor may be further configured to generate the plurality of pixels such that for each respective pixel, the corresponding uncertainty is represented by using a pixel intensity of the respective pixel.

The processor may be further configured to generate at least one metric that relates to a forecast accuracy of the augmented first image.

The at least one metric may include at least one from among a Symmetric Mean Absolute Percentage Error (SMAPE) metric, a Mean Absolute Scaled Error (MASE) metric, a Likelihood metric, and an Earth Mover's Distance (EMD) metric.

The first set of time-series data may include at least one from among a synthetic harmonic dataset, a synthetic mean-reverting dataset that is generated by using an Ornstein-Uhlenbeck (OU) process, a set of electrocardiogram (ECG) data, and a set of stock price data.

According to yet another exemplary embodiment, a non-transitory computer readable storage medium storing instructions for using images that represent time-series data to forecast corresponding images depicting future values of the time-series data is provided. The storage medium includes executable code which, when executed by a processor, causes the processor to: receive a first set of time-series data; convert the first set of time-series data into a partial first image that includes at least one blank region to which future data to be included in the first set of time-series data corresponds; and perform an inpainting operation with respect to the partial first image by generating a plurality of pixels for filling in the at least one blank region in order to produce an augmented version of the first image.

When executed by the processor, the executable code may further cause the processor to: receive a plurality of training sets of time-series data; convert each respective one of the plurality of training sets of time-series data into a corresponding one of a plurality of training images; and use the plurality of training images in conjunction with the partial first image to perform the inpainting operation.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
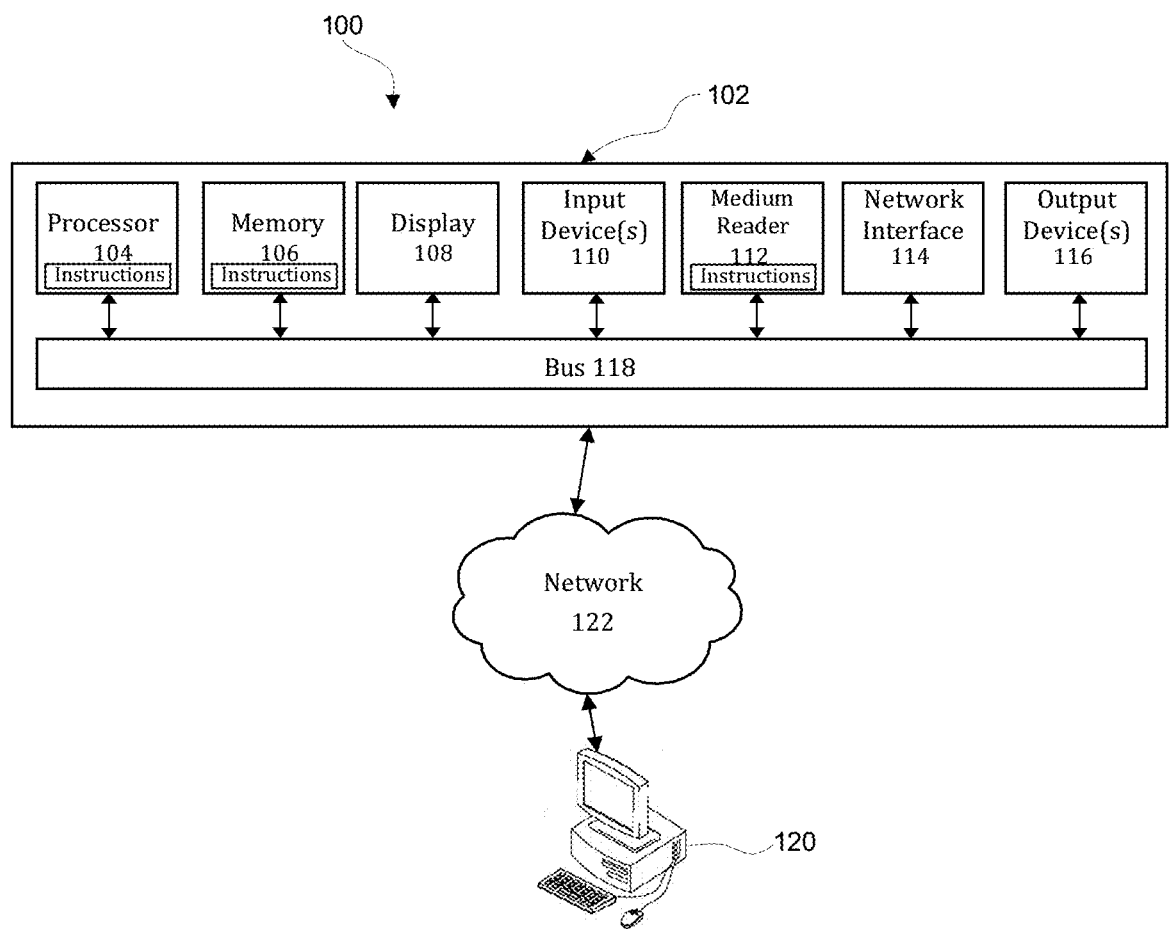
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component.

The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for forecasting time series by capturing input data as images and using a model that outputs a visual depiction of the future.

Figure 2:
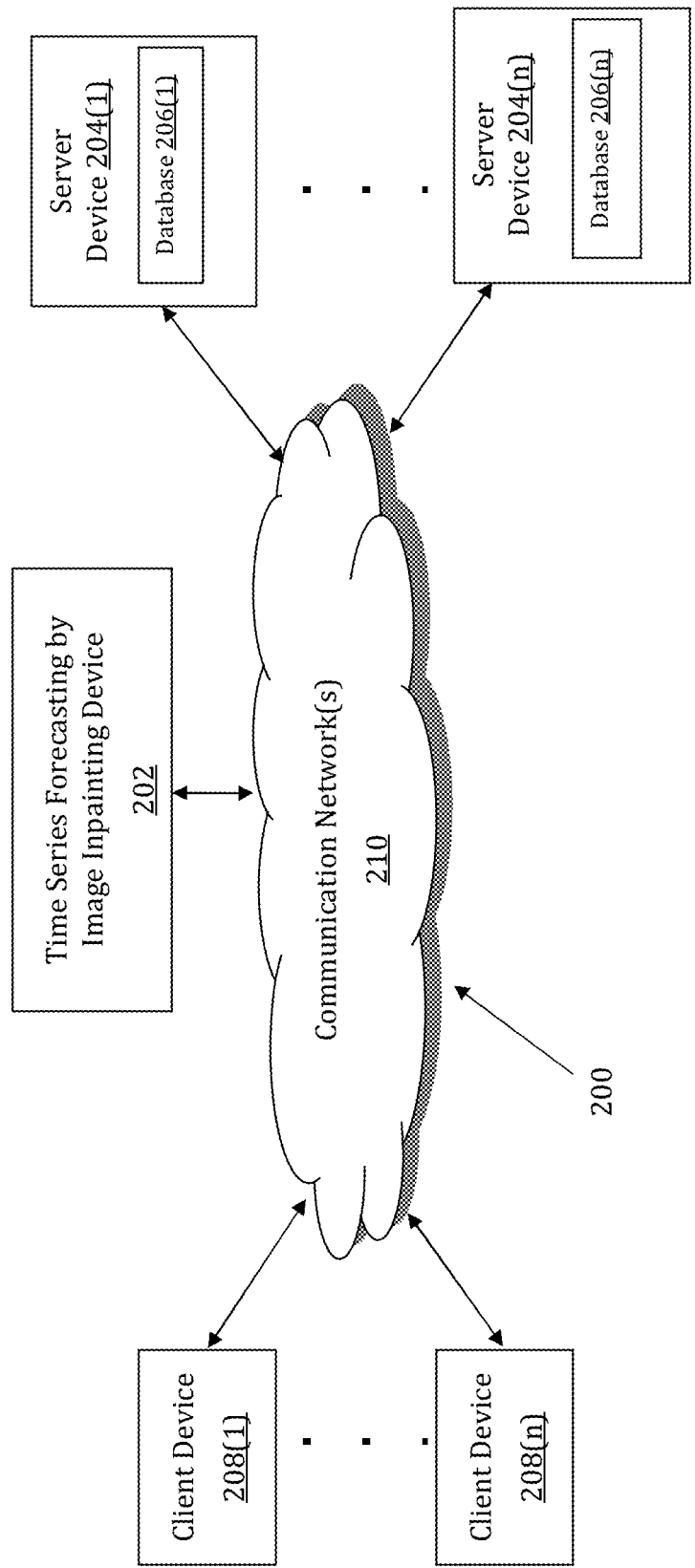
FIG. 2 illustrates an exemplary diagram of a network environment.

Referring to FIG. 2, a schematic of an exemplary network environment 200 for implementing a method for forecasting time series by capturing input data as images and using a model that outputs a visual depiction of the future is illustrated. In an exemplary embodiment, the method is executable on any networked computer platform, such as, for example, a personal computer (PC).

The method for forecasting time series by capturing input data as images and using a model that outputs a visual depiction of the future may be implemented by a Time Series Forecasting by Image Inpainting (TSFII) device 202. The TSFII device 202 may be the same or similar to the computer system 102 as described with respect to FIG. 1. The TSFII device 202 may store one or more applications that can include executable instructions that, when executed by the TSFII device 202, cause the TSFII device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TSFII device 202 itself, may be located in virtual server(s) running in a cloud-based computing environment rather than being tied to one or more specific physical network computing devices. Also, the application(s) may be running in one or more virtual machines (VMs) executing on the TSFII device 202. Additionally, in one or more embodiments of this technology, virtual machine(s) running on the TSFII device 202 may be managed or supervised by a hypervisor.

In the network environment 200 of FIG. 2, the TSFII device 202 is coupled to a plurality of server devices 204(1)-204(n) that hosts a plurality of databases 206(1)-206(n), and also to a plurality of client devices 208(1)-208(n) via communication network(s) 210. A communication interface of the TSFII device 202, such as the network interface 114 of the computer system 102 of FIG. 1, operatively couples and communicates between the TSFII device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TSFII device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and TSFII devices that efficiently implement a method for forecasting time series by capturing input data as images and using a model that outputs a visual depiction of the future.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TSFII device 202 may be a standalone device or integrated with one or more other devices or apparatuses, such as one or more of the server devices 204(1)-204(n), for example. In one particular example, the TSFII device 202 may include or be hosted by one of the server devices 204(1)-204(n), and other arrangements are also possible. Moreover, one or more of the devices of the TSFII device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TSFII device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that historical time series images and information that relates to current time series for which future forecasts are desired.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the TSFII device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the TSFII device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the TSFII device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TSFII device 202, the server devices 204(1)-204(n), or the client devices 208(1)-208(n), for example, may be configured to operate as virtual instances on the same physical machine. In other words, one or more of the TSFII device 202, the server devices 204(1)-204(n), or the client devices 208(1)-208(n) may operate on the same physical device rather than as separate devices communicating through communication network(s) 210. Additionally, there may be more or fewer TSFII devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable traffic form (e.g., voice and modem), wireless traffic networks, cellular traffic networks, Packet Data Networks (PDNs), the Internet, intranets, and combinations thereof.

Figure 3:
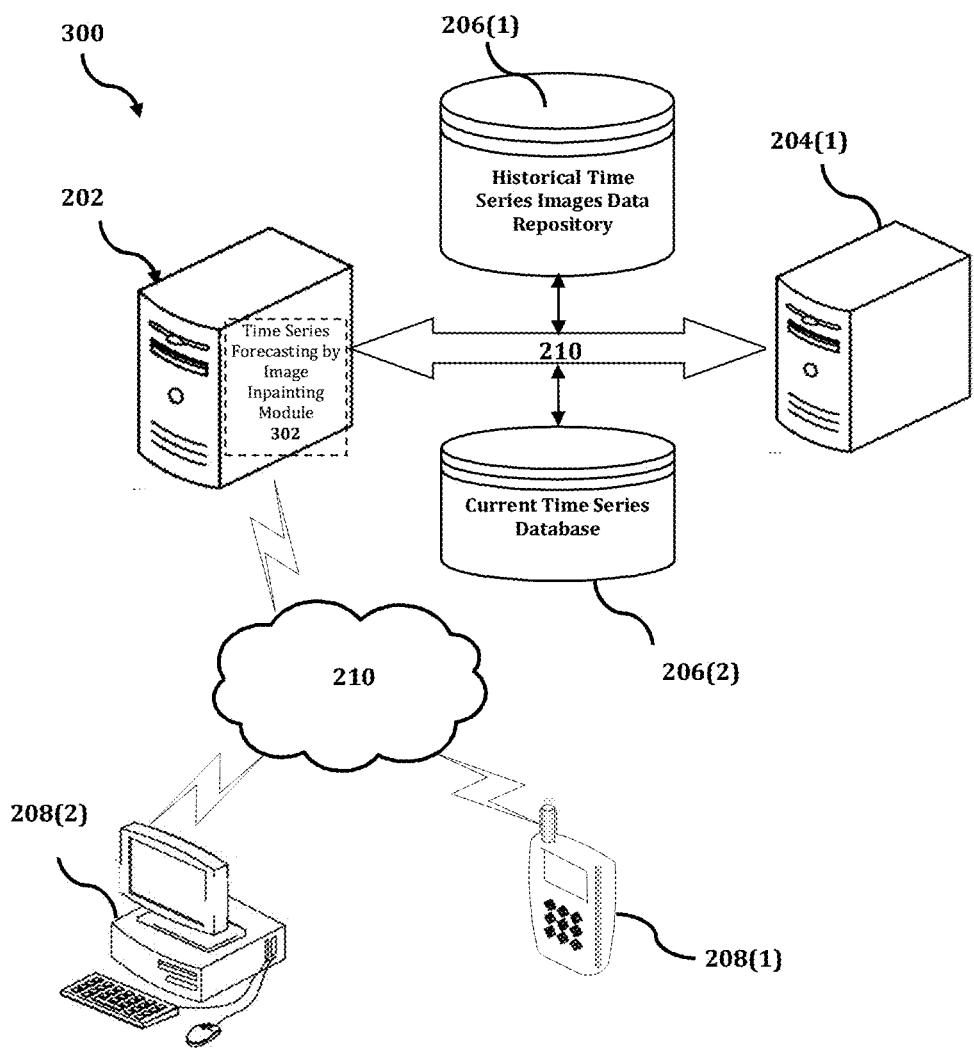
FIG. 3 shows an exemplary system for implementing a method for forecasting time series by capturing input data as images and using a model that outputs a visual depiction of the future.

The TSFII device 202 is described and illustrated in FIG. 3 as including a time series forecasting by image inpainting module 302, although it may include other rules, policies, modules, databases, or applications, for example. As will be described below, the time series forecasting by image inpainting module 302 is configured to implement a method for forecasting time series by capturing input data as images and using a model that outputs a visual depiction of the future.

An exemplary process 300 for implementing a mechanism for forecasting time series by capturing input data as images and using a model that outputs a visual depiction of the future by utilizing the network environment of FIG. 2 is illustrated as being executed in FIG. 3. Specifically, a first client device 208(1) and a second client device 208(2) are illustrated as being in communication with TSFII device 202. In this regard, the first client device 208(1) and the second client device 208(2) may be "clients" of the TSFII device 202 and are described herein as such. Nevertheless, it is to be known and understood that the first client device 208(1) and/or the second client device 208(2) need not necessarily be "clients" of the TSFII device 202, or any entity described in association therewith herein. Any additional or alternative relationship may exist between either or both of the first client device 208(1) and the second client device 208(2) and the TSFII device 202, or no relationship may exist.

Further, TSFII device 202 is illustrated as being able to access a historical time series images data repository 206(1) and a current time series database 206(2). The time series forecasting by image inpainting module 302 may be configured to access these databases for implementing a method for forecasting time series by capturing input data as images and using a model that outputs a visual depiction of the future.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the TSFII device 202 via broadband or cellular communication. Of course, these embodiments are merely exemplary and are not limiting or exhaustive.

Upon being started, the time-series forecasting by image inpainting module 302 executes a process for forecasting time series by capturing input data as images and using a model that outputs a visual depiction of the future. An exemplary process for forecasting time series by capturing input data as images and using a model that outputs a visual depiction of the future is generally indicated at flowchart 400 in FIG. 4.

Figure 4:
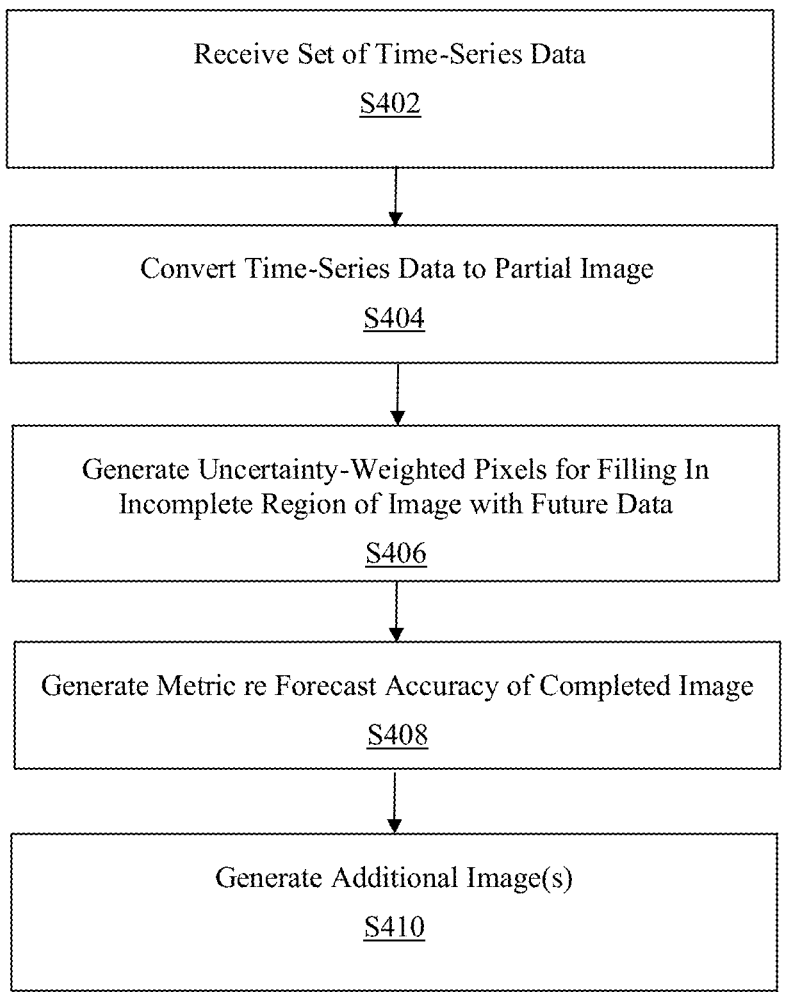
FIG. 4 is a flowchart of an exemplary process for implementing a method for forecasting time series by capturing input data as images and using a model that outputs a visual depiction of the future.

In process 400 of FIG. 4, at step S402, the time series forecasting by image inpainting module 302 receives a set of time-series data. In an exemplary embodiment, the time-series data may include any of a synthetic harmonic dataset, a synthetic mean-reverting dataset that is generated by using an Ornstein-Uhlenbeck (OU) process, a set of electrocardiogram (ECG) data, and set of stock price data.

At step S404, the time series forecasting by image inpainting module 302 converts the time-series data received in step S402 into a partial image that includes at least one blank region that corresponds to future data to be included in the same time series.

At step S406, the time series forecasting by image inpainting module 302 performs an inpainting operation by generating pixels for filling in the blank region (or regions), in order to produce an augmented version of the image. In an exemplary embodiment, the time series forecasting by image inpainting module 302 may receive one or more training sets of time-series data, which may then be converted into training images, which may in turn be used in conjunction with the partial image for performing the inpainting operation. In an exemplary embodiment, the training images may be used to generate a historical database and/or to supplement existing training images that have previously been stored in the historical database, and the time series forecasting by image inpainting module 302 may use the training images stored in the historical database for training a machine learning algorithm that is designed to perform the inpainting operation.

As a practical matter, each respective pixel that is generated in step S406 is associated with a respective probability that indicates a corresponding uncertainty with respect to an accuracy of the respective pixel. In an exemplary embodiment, while in the process of generating the pixels, the time series forecasting by image inpainting module 302 ensures that the corresponding uncertainty for each respective pixel is represented by using a pixel intensity of the respective pixel.

At step S408, the time series forecasting by image inpainting module 302 generates at least one metric that relates to a forecast accuracy of the augmented version of the image. In an exemplary embodiment, the metrics include any one or more of a Symmetric Mean Absolute Percentage Error (SMAPE) metric, a Mean Absolute Scaled Error (MASE) metric, a Likelihood metric, and an Earth Mover's Distance (EMD) metric.

At step S410, the time series forecasting by image inpainting module 302 generates at least one additional image, where each additional image depicts a respective set of future values that corresponds to the same set of time-series data. For example, when the set of time-series data received in step S402 is stock price data for a particular day D that is originally received at hour H during day D and there are several hours of trading that have not yet occurred, the time series forecasting by image inpainting module 302 may convert the received set of time-series data into a partial image that depicts the stock price data for a full trading day and that includes a blank region that corresponds to the hours of trading that have not yet occurred. Then, the inpainting operation may be performed in order to fill in the blank region of the partial image; and further, additional images that correspond to subsequent trading days may be generated.

Forecasting time series data is an essential step in many decision-making processes. The present inventive concept is inspired by humans who reason about the evolution of numerical time series as visual plots, with a particular focus on the financial domain. In an exemplary embodiment, the following disclosure introduces a Pixelate Transform that converts time series data to image representations, and presents their use for classification and prediction of timeseries data, such as, for example, financial market data. Common methods, with varied classification and prediction results, treat time series data as an actual list of values. The Pixelate Transform captures input data as images and then trains a classifier and also a forecaster, which provides probabilistic visual depictions of the future. For the classification use, images of time series are presented according to how a human would act upon them in a stock trading application. For the creation of forecasts, an inpainting image technique that probabilistically fills in the future interval is used. The prediction method is evaluated against several synthetic and real data sets of varying complexity. Experiments show that visual forecasting using the Pixelate Transform can be very effective for cyclic data and also predictive for irregular data such as stock prices.

In an exemplary embodiment, the systems and methods described herein are useful with respect to financial applications, for which data is often available in a numeric form, but humans make decisions on them only after observing the data in a visual form. For instance, traders often execute trades while observing financial time series images as charts on their desktop screens.

There are several advantages to a visual approach to forecasting that provides an image of the future data. Importantly, a visual approach may offer a probabilistic prediction, as opposed to simple point estimates of future values. Visual forecasting is an unconstrained data-driven non-parametric method. Accordingly, visual forecasting is flexible and adaptable to many data forms, while other approaches may be tailored to the particularity of the data at hand. Additionally, visual forecasting tends to provide robust and stable predictions, as further described below.

Figure 5:
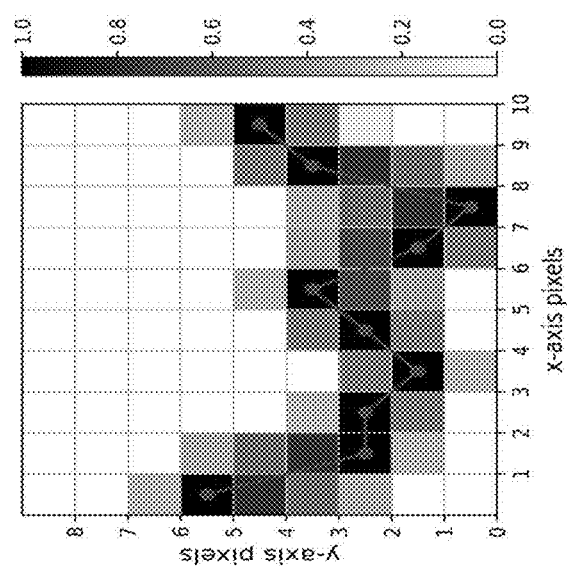
FIG. 5 is an illustration of a process of converting numeric time series data into a pixelated image in connection with a process for implementing a method for forecasting time series by capturing input data as images and using a model that outputs a visual depiction of the future, according to an exemplary embodiment.

FIG. 5 is an illustration of a process of converting numeric time series data into a pixelated image in connection with a process for implementing a method for forecasting time series by capturing input data as images and using a model that outputs a visual depiction of the future, according to an exemplary embodiment.

The Pixelate Transform: In an exemplary embodiment, time series data is converted into images to be considered for classification or forecasting tasks. As illustrated in FIG. 5, numeric information may be transformed into a pixel diagram, which will serve as a visual representation of the information in hand. The process of drawing information as points, lines, or curves as pixels is often called rasterizing First, a process of transformation for a point is formally defined, followed by a definition for a line that connects two points, and finally, a definition for a curve that connects multiple lines. These building blocks are then used to transform a numeric time series to an image. These time series images are subsequently usable in connection with different learning problems.

Given some timeseries information I, a definition is provided for a mapping $T: I \to P^d$ that projects I onto a Pixel space $P^d$ that is represented as a matrix with dimension $d=(d_1, d_2, \ldots, d_n)$, where dis are finite positive integers. $P^d$ consists of a finite number of locations, and each location is called a pixel. For example, $P^{d_1}$ represents a vector of $d_1$ pixels, while $P^{d_1,d_2}$ represents a $d_1$-by-$d_2$ matrix with $d_1$ rows and $d_2$ columns and thus $d_1 \times d_2$ pixels.

Without loss of generality, the values of $T(I) \in [0,1]$ for all pixels, where the range of values [0,1] represents the grayscale that varies from black to white, correspondingly.

Point transformation: Point rasterization involves the transformation of a point $p \in I$, $I=R$, to a position (pixel location) $l \in W$, $W=\mathbb{N}$, in the the 1D Pixel space of length $d_1$, $P^{d_1}$, such that $l \in \{0, 1, \ldots, d_1-1\}$. If the zero-th ($0^{th}$) pixel is denoted as the one covering the real number range [0,1), and the first ($1^{st}$) pixel is denoted as the one covering the range [1,2), etc., then a simple binary nearest neighbor rasterizing scheme can be defined as $$T(l;p)=1 \text{ if } \lfloor p \rfloor = l, 0 \text{ otherwise,} \quad (1)$$

For example, $T(0;p=0.9)=1$, while $T(1;p=0.9)=0$.

An anti-aliased rasterizing scheme can be defined by linearly interpolating p over the two closest pixels, by using floor and ceiling operators. In this example, $T(0;p=0.9)=0.9$, while $T(1;p=0.9)=0.1$.

In higher dimensions, where $p \in I$ and $I=R^n$, the above logic holds given that $l \in W^n$ and the floor and ceiling operators are applied element-wise in $R^n$.

Line Transformation: A line segment in $R^n$ can be defined by its starting and ending coordinates (s,e), where $s,e \in R^n$. The standard approach of rasterizing lines in computer graphics follows the classical digital differential analyzer (DDA) algorithm, Bresenham's algorithm, or Xiaolin Wu's algorithms. These iterative approaches consider the pixels that intersect or are proximate to the line segment.

Following the point transformation logic as described above, a definition is provided for a rasterization function that computes a scalar field over the set of pixel locations, $T(l;(s,e))$. To rasterize a line segment between two points in $R^n$, it is important to define how close an active pixel (i.e., with value greater than zero) can be next to the line segment. For that, a definition is provided for the matrix 6 as the Euclidean distance between an arbitrary pixel and the line segment as follows:

$$\delta(l;(s,e)) = \|l-s\|_2 \text{ if } t<0.$$

$$\|l-(s+tm)\|_2 \text{ if } 0 \le t \le 1, \quad (2)$$

$$\|l-e\|_2 \text{ if } t>1,$$

where the scalar $t=((l-s) \cdot m)/(m \cdot m)$, is the scaled distance of any pixel to the line segment, $m=e-s$ is the vector connecting the start and end of the line segment, and $\|\cdot\|_2$ is the $L_2$ norm.

Using this formulation, a definition is now provided for a rasterization scheme, similar to Equation 1:

$$T(l; s, e)) = \begin{cases} 1 & \text{if } \delta(l; (s, e)) \le \epsilon, \\ 0 & \text{otherwise,} \end{cases} \quad (3)$$

where $\epsilon(\Delta d, g) = P2*[(2g-1)\Delta d/2]^2$, $\Delta d$ is the grid spacing, and g is the number of activated grids away from the signal, i.e., essentially, the degree of linear smoothing.

Figure 6:
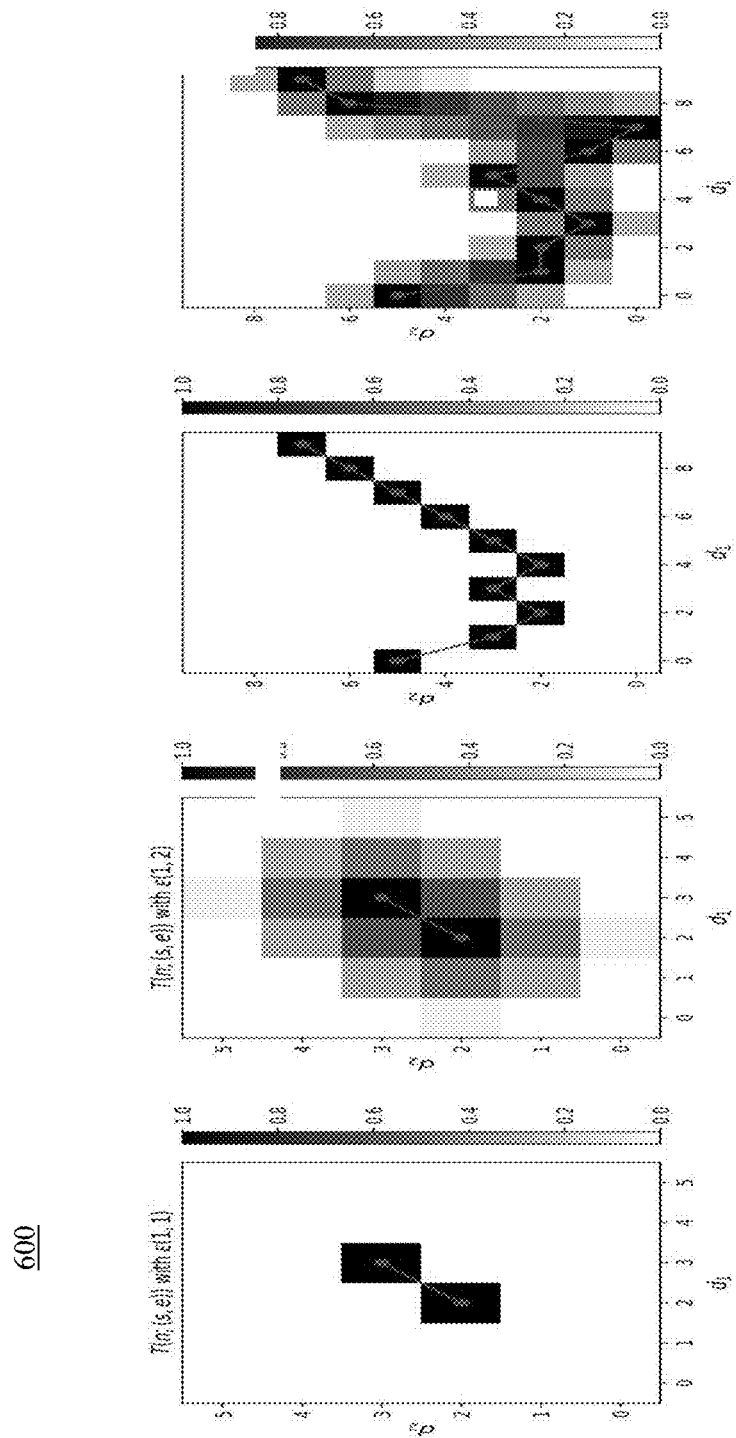
FIG. 6 is an illustration of a line transformation to a pixel space in connection with a process for implementing a method for forecasting time series by capturing input data as images and using a model that outputs a visual depiction of the future, according to an exemplary embodiment.

In this example, for nearest-neighbor rasterization, values are chosen as follows: $\Delta d=1$ and $g=1$, while for an anti-aliased scheme higher g values are applied. FIG. 6 is an illustration 600 of a line transformation to a pixel space in connection with a process for implementing a method for forecasting time series by capturing input data as images and using a model that outputs a visual depiction of the future, according to an exemplary embodiment. In particular, FIG. 6 shows an example for a line transformation onto a $d_1 \times d_2$ Pixel space $P^d$ with $d=(6,6)$, $(s,e)=((2,2),(3,3))$, $\Delta d=1$, and $g=1$ on the top left, and $g=2$ on the top right.

Multiple Lines Transformation: In an exemplary embodiment, attention is focused on the transformation of time-series data to Pixel images. This corresponds to the transformation of curves as a collection of finite number of sub-segments. A formal definition of such transformation follows by considering $$(s, e) = \bigcup_{i=1}^{M} (s^i, e^i),$$

where $e_i = s_{i+1}$ for $1 \leq i < M$, M is the cardinal number of the sub-segments, and T applied to each sub-segment and computed as in Equation 3. An example can be seen in the bottom row of FIG. 6 where a numerical time series data is transformed to an image as a collection of finite number of sub-segments. The bottom left panel shows a nearest-neighbor rasterization scheme with g=1, while the bottom right panel shows an anti-aliased scheme with g=2.

As further described below, the vertical axis is used as a way of standardizing the information, and the last data point is always placed in the middle of vertical axis of the image.

Time Series Classification with Images: The following is a description of the use of the Pixelate Transform as part of a process to classify images of time series data for equity buy or sell decisions. The intent here is to replicate the behavior of some human traders who make trading decisions on the basis of visual or technical signals. For clarity, there is an acknowledgement that markets are efficient, i.e., that future price movements have almost no predictability. However, trading professionals often use systematic methods like these, characterized by a set of rules centered on visual indicators created from the time series data. The goal here is to replicate that systematic behavior. Accordingly, in an exemplary embodiment, the methodology described herein may be evaluated by confirming how well it can replicate this behavior, as opposed to being evaluated based on profitability.

Visual object recognition and object detection using machine learning and deep neural networks have shown great success in recent years. In an exemplary embodiment, an examination of the value in transforming the problem of numerical time-series analysis to that of image classification is performed. A focus is provided on a financial trading application after noticing that human traders most often issue their trade orders while observing images of financial timeseries on their screens. As a result, a suggestion is made that the transformation of time-series analysis to a Computer Vision problem is effective in identifying trade decisions typical for humans using technical analysis.

Problem Statement—Classification: In an exemplary embodiment, a determination is made regarding whether it is possible to build a visual system that identifies and replicates the way human systematic traders behave when they use visual technical analysis. To investigate, extensive financial time-series image data is created from historical data. Three known label-generating rules following rule-based strategies that replicate the way some professionals trade are used. Using a supervised classification approach, predictions of these human decisions are evaluated using several classifying algorithms, and a showing is made that the models are effective in identifying the complicated, sometimes multi-scale, labels. In this regard, the intent here is to demonstrate the value of the transformation of the problem into the visual space, and less about the particular algorithm used to make the classification.

Data and Methods—Classification: In an exemplary embodiment, Yahoo Finance price data for companies that comprise the S&P 500 index for the period 2010-2018 (hereafter referred to as "S&P 500 data") is used. These stocks represent the 500 largest U.S. companies by market capitalization. Their value represents the vast majority of the American equity market.

While trading is conducted continuously between 9:30 a.m. and 4:00 p.m. in U.S. markets, in the present disclosure, the data accumulated at the end of each trading day, typically referred to as "daily data," is considered. This includes information for the start (opening), maximum, minimum, and ending (closing) values per stock per day, commonly referred to as Open, High, Low, and Close (OHLC) values. The data is presented visually using a box-and-whisker diagram, also referred to herein as a candlestick diagram, where box edges mark the Open and Close price, while the whiskers mark the Low and High values (i.e., daily minimum and maximum).

Figure 7:
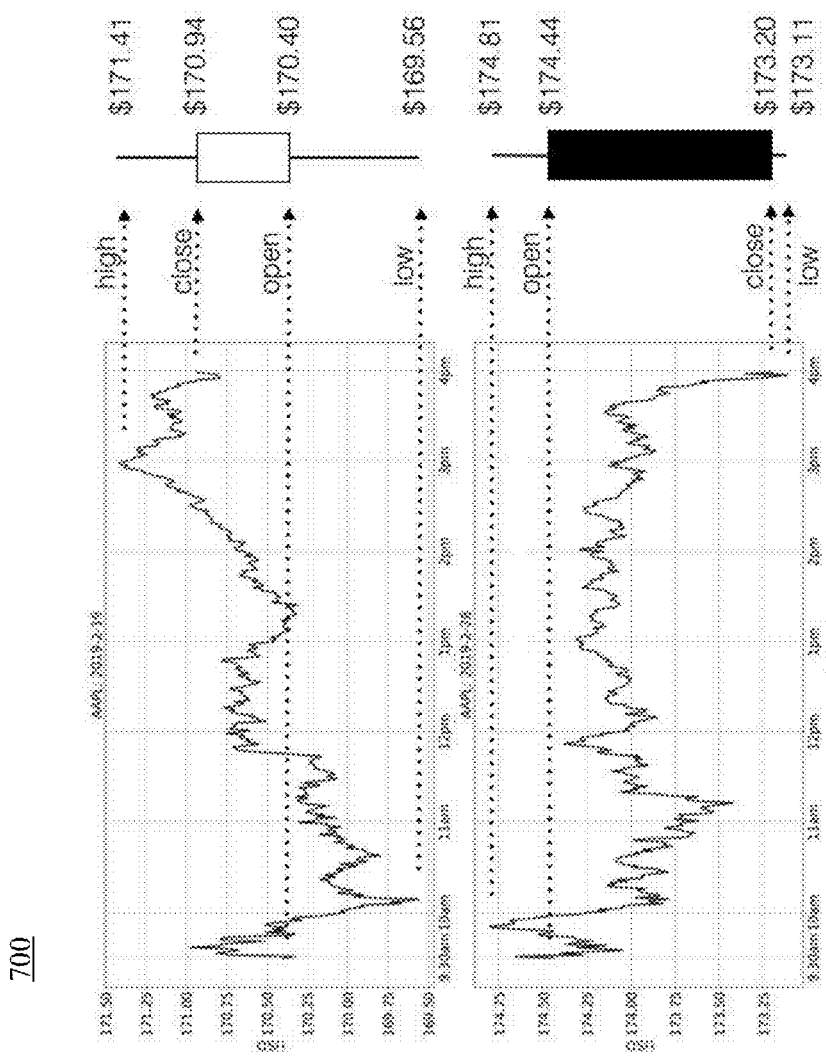
FIG. 7 is an illustration of how continuous time series data is converted to a candlestick diagram in connection with a process for implementing a method for forecasting time series by capturing input data as images and using a model that outputs a visual depiction of the future, according to an exemplary embodiment.

FIG. 7 is an illustration 700 of how continuous time series data is converted to a candlestick diagram in connection with a process for implementing a method for forecasting time series by capturing input data as images and using a model that outputs a visual depiction of the future, according to an exemplary embodiment. In particular, FIG. 7 shows an example of this process using data for the ticker AAPL (Apple Computer) for Feb. 19, 2019, and Feb. 28, 2019. The two images on the left show the 1-minute trading data during trading hours, while the right column illustrates the conversion to a candlestick. It is noted that the upper left time-series experiences a positive trend resulting in a white candlestick visualization, while the bottom left time-series data experiences a negative trend resulting in a black candlestick.

In an exemplary embodiment, this approach is evaluated by using three popular technical indicators, where each indicator is based on a particular algebraic rule that is computed from recent previous Close values. The indicators are designed to alert the trader to buying opportunities. If a trader decides to follow one of the signals, they may do so at any point no earlier than the day after the opportunity the signal was computed. The three "buy" signals considered herein are defined as follows:

1) BB crossing: The Bollinger Bands (BB) indicator for a given time-series consists of two symmetric bands constructed over 20-periods moving two standard deviations above and below the 20-period average price. Traders use the price bands as bounds that trigger a buy or sell. When the current price extends below the lower band, prices are considered to be in an oversold position and thus, a buying opportunity.

Figure 8:
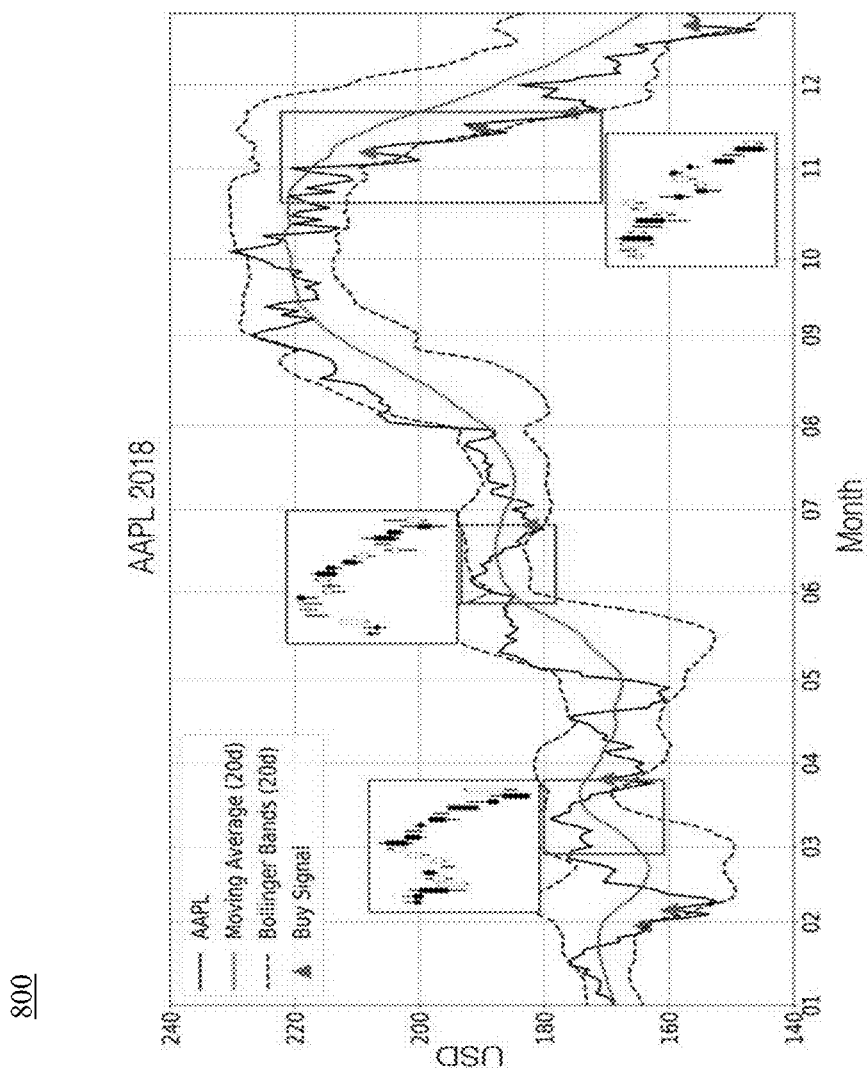
FIG. 8 is an illustration of labeling time series data according to the Bollinger Bands crossing rule in connection with a process for implementing a method for forecasting time series by capturing input data as images and using a model that outputs a visual depiction of the future, according to an exemplary embodiment

FIG. 8 is an illustration 800 of labeling time series data according to the Bollinger Bands crossing rule in connection with a process for implementing a method for forecasting time series by capturing input data as images and using a model that outputs a visual depiction of the future, according to an exemplary embodiment. In particular, FIG. 8 shows an example of a Buy signal opportunities for the AAPL stock during 2018. One can see the daily Close values for the ticker while the 20-days moving average (inclusive) of the price line is also shown. The dashed lines mark the two standard deviations above and below the moving average line. The BB crossing algorithm states that a Buy signal is initiated when the price line crosses above the lower dash line. In FIG. 8, marked by the solid triangles, one can identify eight such buy opportunities.

2) MACD crossing: Moving Average Convergence Divergence (MACD) is a trend-following momentum indicator that compares the relationship between short and long exponential moving averages (EMA) of an asset. As is common in finance, the MACD may be computed by subtracting the 26-days EMA from the 12-days EMA. When MACD falls to negative values, this suggests negative momentum and conversely, when the MACD rises to positive values, this indicates upward momentum. Traders usually wait for consistent measures, thus smoothing the MACD line further by computing the 9-day EMA of the MACD, known as the signal line. Here, the MACD buy signal is defined to trigger when the signal line crosses above.

3) RSI crossing: The Relative Strength Index (RSI) is an oscillating indicator that summarizes the magnitude of recent price changes to evaluate the overbought or oversold conditions of an asset. As is common in finance, RSI may be computed as the ratio of the 14-days EMA of the incremental increase to the incremental decrease in asset values. The ratio is then scaled to values that vary between 0 and 100: the ratio rises as the number and size of daily gains increases and falls as the number and size of daily losses increases. Traders use RSI as an indication of either an overbought or an oversold state. An overbought state might trigger a sell order; an oversold state might trigger a buy order. The standard thresholds for oversold/overbought RSI are 30/70, respectively. Here, the RSI buy signal is defined to trigger when the RSI line crosses above the value of RSI=30.

FIG. 8 shows three positively-labeled images that correspond to a "buy" indication from the BB-crossing algorithm. These images are generated by enveloping 20 days of stock activity before and including the buy-signal day activity. It is also possible to create negatively labeled images from this time-series by enveloping activity, in the same way, for days with no buy signal. It is also noted that these images tightly bind the trade activity and do not contain labels, tickers, or title, which is the essential input data standardization preprocess applied herein.

Classification Results: In an exemplary embodiment, one objective is to examine whether or not a visual model can be trained to reproduce trading signals originating from technical analysis, but without access to the signals themselves. Can the system learn to respond to these signals based on visual data only? An examination is made of the supervised classification predictions of the time-series images that are labeled according to the BB, RSI, and MACD algorithms.

The data set is balanced, containing 5,000 samples per class per indicator. In particular, for each of the S&P 500 tickers, all buy triggers for the period between 2010 and the end of 2017 are computed. Then, a random selection of 10 buy triggers is made for each ticker and corresponding images are created. In the same way, a random selection of 10 no-buy triggers is made per ticker and similar images are created. This process results in 10,000 high-resolution images per trigger.

A key difference between the three algorithms, besides their varying complexity, is the time-span each considers. While the BB algorithm takes into account 20 days of price action, RSI, which uses exponential-moving averaging, considers effectively 27 days. MACD, which also uses exponential moving averages, spans effectively over 26 days. For each of the triggers, the images are cropped according to the number of effective trading days they consider. In other words, each sample includes 80 to 108 columns of data depending on the size of the window required to compute the label (i.e., 4×20 for the BB crossing, and 4×26, 4×27 for the MACD and RSI respectively).

Figure 9:
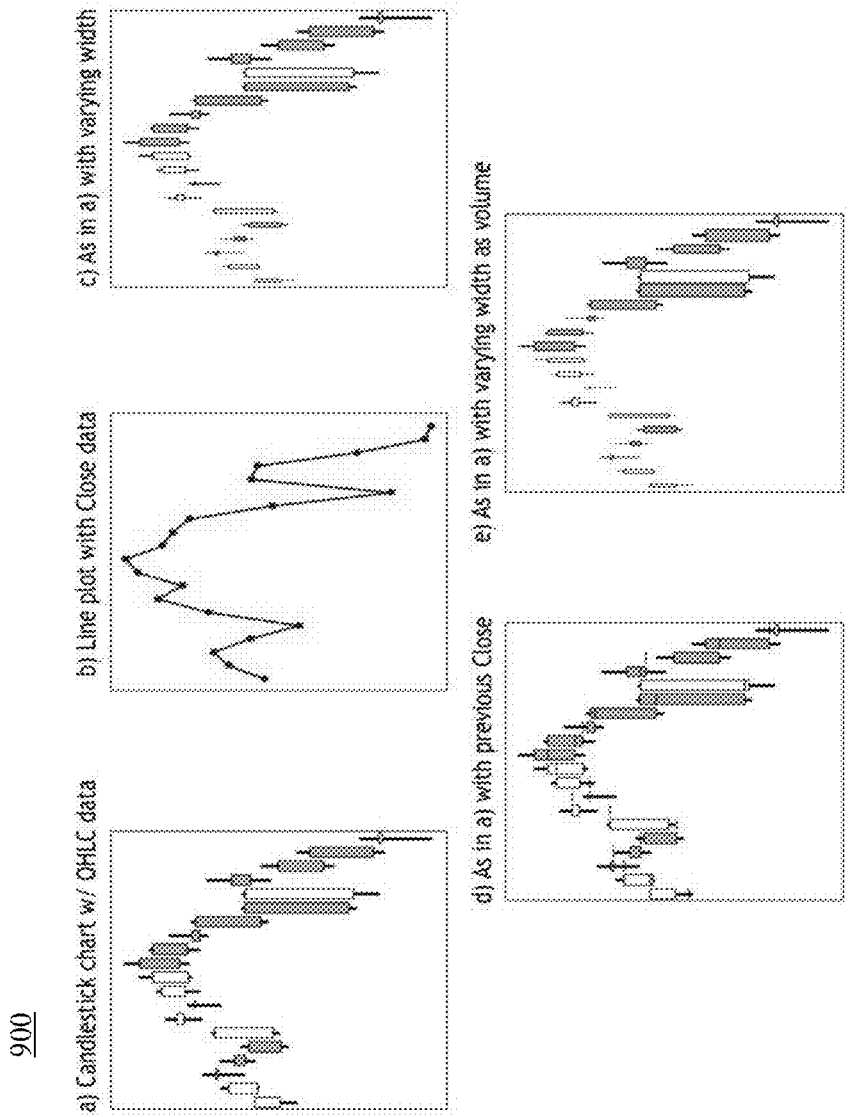
FIG. 9 is an illustration of various types of visual representations of the same time-series data in connection with a process for implementing a method for forecasting time series by capturing input data as images and using a model that outputs a visual depiction of the future, according to an exemplary embodiment.

FIG. 9 is an illustration 900 of various types of visual representations of the same time-series data in connection with a process for implementing a method for forecasting time series by capturing input data as images and using a model that outputs a visual depiction of the future, according to an exemplary embodiment. In particular, FIG. 9 depicts an example of five different visual designs. Panel a) uses the OHLC data as shown in FIG. 7, while panel b) uses only the Close values plotted as a line chart. The design of panel b) serves as a reference performance level.

In an exemplary embodiment, a key element is how to express the direction and notion of time, or recency, in static images. A simple way of incorporating recency in the images is via the labels. Each image is labeled according to trade opportunities, which are defined by crossing above a threshold at the right part of the image. The labels are time-dependent and are tied to a specific region in the chart; thus, implicitly, they deliver the notion of time to the static images. Another way of incorporating recency in the images is to incorporate the notion of time directly in them. The designs at panels c) and d) aim at explicitly representing the direction of time by either linearly varying the width of the boxes towards the right, as in panel c), or by overlaying the previous Close value as a horizontal line on each of the candlesticks, as in panel d). Lastly, in panel e), the OHLC data is augmented by incorporating the trade volume in the candlestick visualization by varying the width of each box according to the relative change of the trade volume within the considered time frame. Recall that all three label generating rules consider only the Close value, but each Close value is influenced by its preceding daily activity, as reflected in the visualization of the candlestick. One expects a trained model to either filter out unnecessary information or discover new feature relationships in the encoded image and identify the label-generating rule.

Following the above-described process, high-resolution images are created based on the discrete form of the data. Another question to be addressed is what resolution is needed to be maintained for proper analysis. The problem is that the higher the resolution, the more amplification is provided to the pixelated feature space, thus introducing more noise to the models and possibly creating unwanted spurious correlations. This point is examined by varying the resolution of the input images in logarithmic scale and comparing the accuracy score of a hard voting classifier over the following 16 trained classifiers: Logistic Regression, Gaussian Naive-Bayes, Linear Discriminant Analysis, Quadratic Discriminant Analysis, Gaussian Process, KNearest Neighbors, Linear SVM, RBF SVM, Deep Neural Net, Decision Trees, Random Forest, Extra Randomized Forest, Ada Boost, Bagging, Gradient Boosting, and Convolutional Neural Net. The focus here is on comparing the aggregated performance of the models while changing the representation of the input space.

Figure 10:
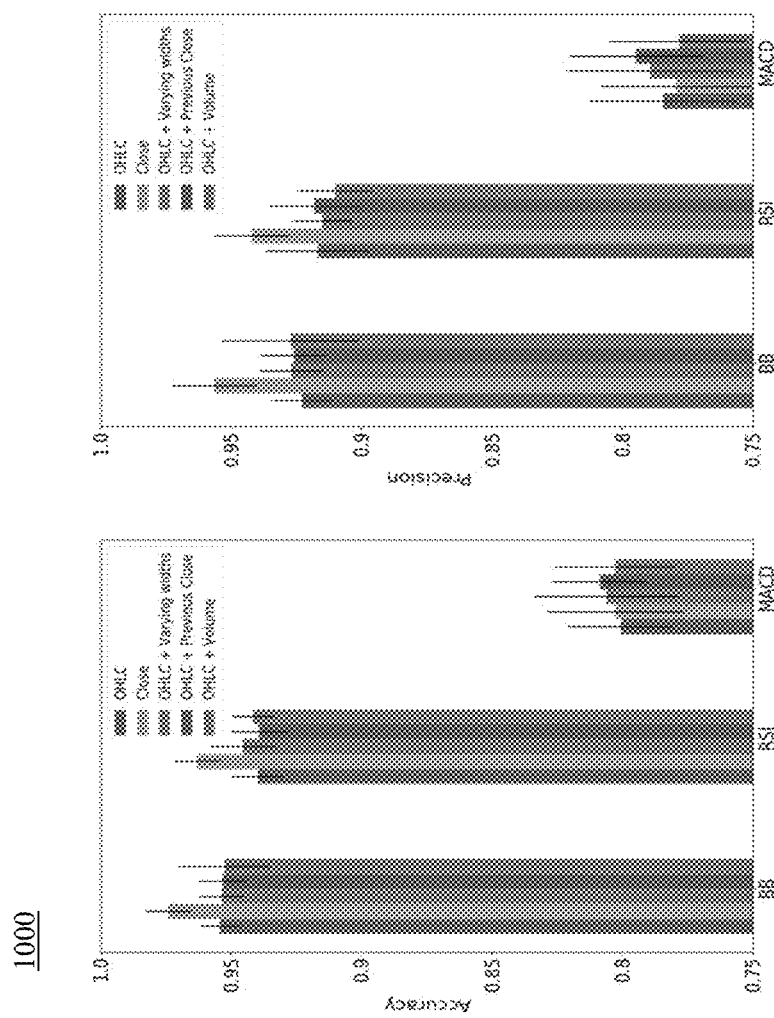
FIG. 10 is an illustration of supervised classification accuracy and precision scores for various triggers as a function of different input representations in connection with a process for implementing a method for forecasting time series by capturing input data as images and using a model that outputs a visual depiction of the future, according to an exemplary embodiment.

FIG. 10 is an illustration 1000 of supervised classification accuracy and precision scores for various triggers as a function of different input representations in connection with a process for implementing a method for forecasting time series by capturing input data as images and using a model that outputs a visual depiction of the future, according to an exemplary embodiment. In particular, FIG. 10 compares the predictability skill in the various image representations of the same input data for the three label generating rules. All input representations perform remarkably well, and the predictability skill stands at about 95% for the BB and RSI label-generating rules, while at approximately 80% for the MACD labeled data. It is not surprising to see that the classifiers perform less efficiently on the MACD labeled data, as this labeling-rule is the most complex involving multiple time-scales and smooth operations, all acting in concert.

The best performing input data is the one that uses the Close values exclusively as line plots, while the various OHLC representations fall only a little behind. However, the line plot serves only as a point of reference—the Bayesian performance level. This is because the label-generating rule depends exclusively on the Close values. The key point is the fact that the various visual OHLC representations manage to achieve performance comparable to the Bayesian level. Most importantly, this finding is robust for the BB and RSI, as well as for the MACD algorithm.

Close examination of FIG. 10 shows that augmenting the OHLC input to include explicit time representation in the images by varying the bar widths linearly or by incorporating the previous Close values does not add value. An exception to this is the MACD algorithm. Conversely, encoding the irrelevant volume information in the candlestick images increases uncertainty in predictions for all label-generating rules. The precision score results are represented in the right panel of FIG. 10 and are almost identical to the accuracy scores on the left panel.

Discussion of Classification Results: It is shown that a computer can learn and replicate technical trading methods used by human traders. This is done by transforming the data and the task into a computer vision problem. This finding indicates that classification of financial data using visual representations aids in identifying new patterns and, in some cases, achieves better performance compared to using the raw tabular form of the same data. The results also suggest that a visualization generated for human consumption can be used the input for a classification algorithm. Even very complex multi-scale algebraic operations can be learned by a machine when transforming the task to a computer vision problem. The results are not impacted significantly; even at low resolutions, time-series classification can be achieved effectively.

A key question is whether time-dependent information can be inferred from static images. To be more explicit, if the time axis moves from left to right, data points to the right are more recent and therefore, frequently more important for prediction than data points to the left. However, there remains a question as to how can this kind of information can be conveyed without an independent ordinal variable, such as, for example, a time axis.

Two ways to incorporate time relationships in the images are examined: The first leverages classification labels to support the notion of time; the second augments the images with sequential features in the visualization itself. The candlestick images are labeled using three rule-based algorithms, where each computes a time-dependent function. Thus, each image encapsulates implicitly, via its corresponding label, the notion of time. That is, the signal to be detected is located on the right-most side of the image; the cross-above trigger always occurs because of the last few data points. In an example, the BB crossing algorithm effectively yields an image with a suspected local minimum on the right-hand side of the image. Incorporating time dependency explicitly by image augmentation is considered in two ways, by varying the width of the boxed in the candlestick diagram linearly and by overlaying the previous Close value on each candlestick. It is noteworthy, however, that compared to the implicit label approach, the explicit augmentation is less effective, as can be seen in FIG. 10.

In an exemplary embodiment, all S&P 500 stocks are considered, and the data is not clustered by season, category, or sector. Specific window sizes that correspond to the total length of information required by each algorithm to compute its label are used. To isolate the effect of the various window sizes, an examination is made of the classification results when all window sizes were set to include 30 days of information. It has been found that the performance decreased when the window size added unnecessary information.

It is not necessary to account for the overall positive market performance during the 2010-2018 period, as the analysis is done on short times scales, i.e., about a month or less. One can complement these findings by similarly analyzing for sell signals. This analysis has been repeated for sell signals, and a finding has been made that the overall quantitative results are very similar.

Time Series Forecasting with Images: The Pixelate Transform is not applied to the task of time series forecasting. In an exemplary embodiment, a novel visual forecasting method based on image inpainting is introduced, and its effectiveness on several data sets is demonstrated. The method is evaluated in comparison to other methods.

Problem Statement—Forecasting: Given a time series signal represented as an image, the problem to be addressed is how to generate a visual forecast of the future of the time series signal.

This problem is initially approached by first transforming the numeric time series data into an image, and then leveraging a method called inpainting to construct a visual depiction of the future region to produce forecasts. In an exemplary embodiment, inpainting is a deep learning method that is able to fill in missing sections of input images realistically. Typical applications include completion of photos of people, animals and landscapes when sections are missing, or are deliberately removed.

Inpainting is leveraged as follows: Let X be the set of images of input time series signals with a masked future region, and Y be the set of corresponding forecast output images where the future region is inpainted. A constant c defines the portion of how much the masked future region takes up in X. In experiments, c=0.2 has been used, which means that the right 20% of X is masked. The choice of c=0.2 has been made so that the algorithm has a reasonable amount of information on the past time series (i.e. 80% of X) for the forecasting task.

Data Preprocessing: Given a one-dimensional numeric time series $S=[s_0, \ldots, s_T]$ with $S_t \in R$, S is converted into a two-dimensional image x by plotting it out using the line transform as described above, with t being the horizontal axis and $s_t$ being the vertical axis. Each time series S has been plotted with bounded intervals. The interval for x-axis is $[0-\varepsilon, T+\varepsilon]$, whereas the interval for y-axis is $[\min(s_t)-\varepsilon, \max(s_t)+\varepsilon]$, where $\varepsilon=10^{-6}$. $\min(s_t)$ and $\max(s_t)$ are calculated as the tightest bounds to draw $s_t$ within the image while keeping the point right before the time series prediction happens in the middle of the vertical axis of the image. Each converted image x is standardized through following preprocessing steps. First, all pixels are negated (i.e., x=1−x/255) so that the pixels corresponding to the plotted time series signal are bright, i.e., values close to one (1), whereas the rest of the background pixels become dark i.e., values close to zero (0). Note that there can be multiple bright (non-zero) pixels in each column due to anti-aliasing while plotting the images.

Figure 15:
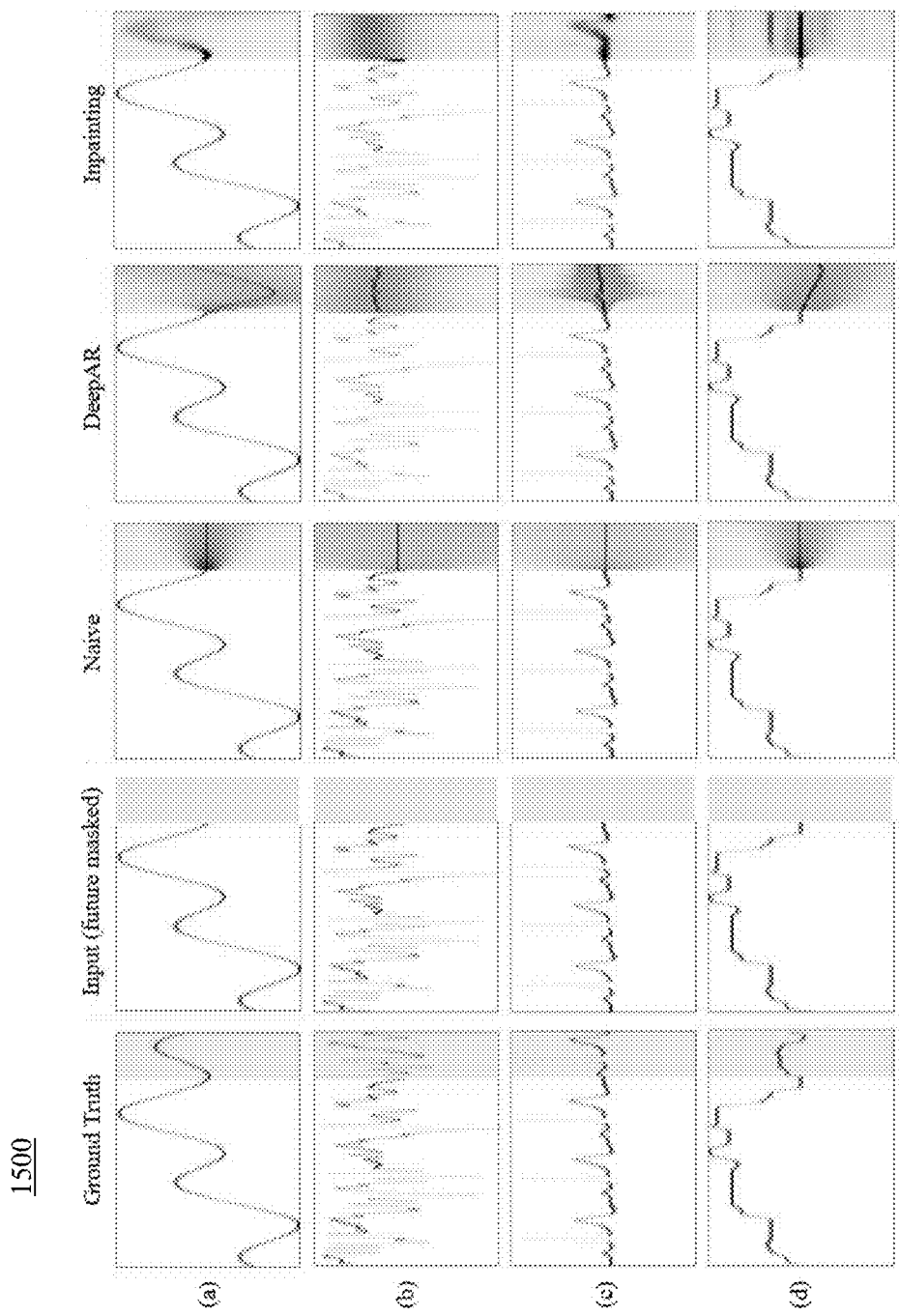
FIG. 15 is an illustration of example out-of-sample forecast predictions using various baseline methods in connection with a process for implementing a method for forecasting time series by capturing input data as images and using a model that outputs a visual depiction of the future, according to an exemplary embodiment.

Upon normalizing each column in x such that the pixel values in each column sum to 1, each column can be treated as a discrete probability distribution (see FIG. 15). Columns represent the independent variable time, while rows capture the dependent variable, which is pixel intensity. The value of the time series S at time t is now simply the pixel index r (i.e., row) at that time (i.e., column) with the highest intensity.

Predictions are made over normalized data. To preserve the ability to forecast in physical units, utilization is made of the span of the input raw data values to transform forecasts back to the corresponding physical scales.

Approach: In an exemplary embodiment, a DeepFillV2 implementation of inpainting has been adapted by inpainting the future region of pixelated time series images. One challenge with the pixelated time series images is that the majority of the information can be concentrated in fine lines, leaving most of the image area empty. Directly applying DeepFillV2 on the pixelated time series images results in learned models that simply inpaint a blank image for the masked region, because these time series images have very sparse occurrences of pixels that are non-zero. In addition, the baseline DeepFillV2 implementation ignores these sparse pixels because they play a relatively insignificant role in its training loss. Accordingly, the adaptation includes an update of the output activation layer to an image column-wise softmax layer, as well as using mean squared error as the loss function. As a result, the model is penalized appropriately during training even though the pixels are relatively sparse.

Figure 11:
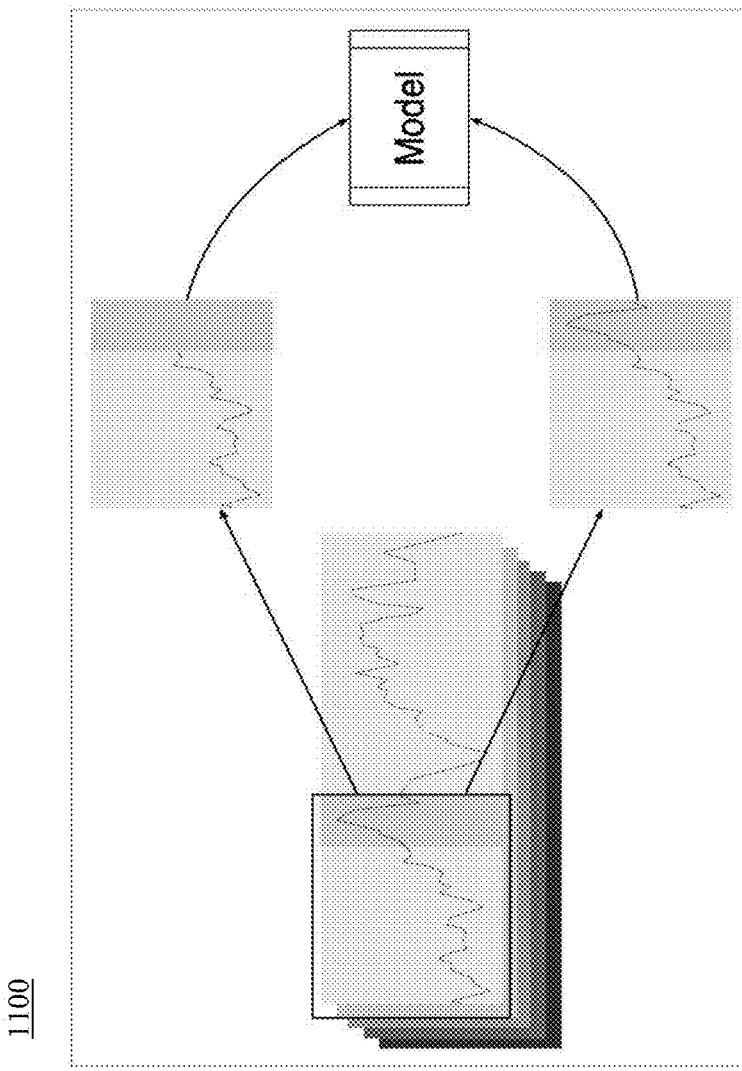
FIG. 11 is an illustration of a use of a large number of images of time-series data for training an inpainting model in connection with a process for implementing a method for forecasting time series by capturing input data as images and using a model that outputs a visual depiction of the future, according to an exemplary embodiment.

FIG. 11 is an illustration 1100 of a use of a large number of images of time-series data for training an inpainting model in connection with a process for implementing a method for forecasting time series by capturing input data as images and using a model that outputs a visual depiction of the future, according to an exemplary embodiment. In experiments, an evaluation is made of the utility of time series forecasting with images using a diverse set of data sets. Taking the financial data set as an example, the model is trained using hundreds of thousands of stock price time series images, as illustrated in FIG. 11.

Figure 12:
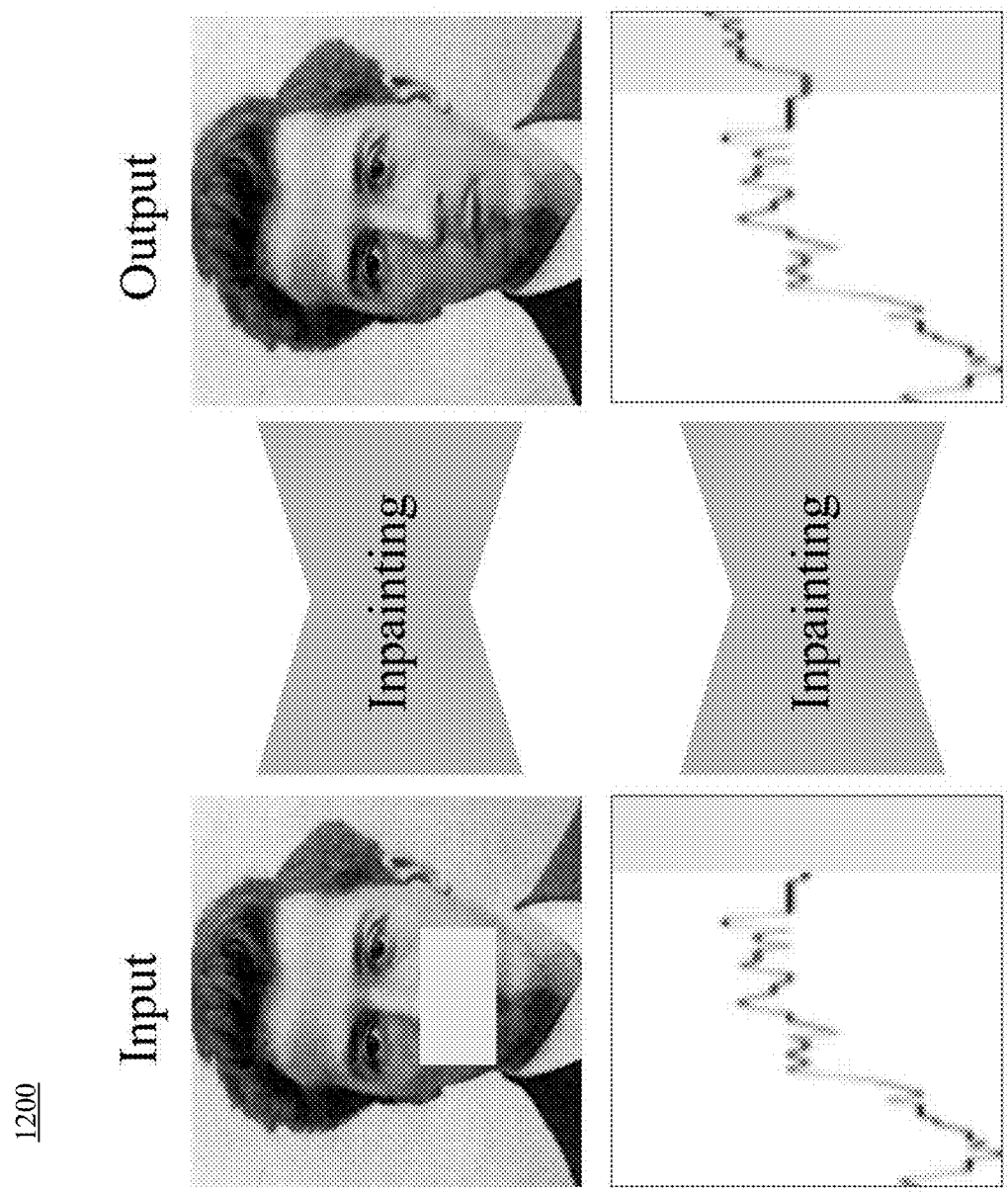
FIG. 12 is an illustration of an overview of an image inpainting operation for time series forecasting in connection with a process for implementing a method for forecasting time series by capturing input data as images and using a model that outputs a visual depiction of the future, according to an exemplary embodiment.

FIG. 12 is an illustration 1200 of an overview of an image inpainting operation for time series forecasting in connection with a process for implementing a method for forecasting time series by capturing input data as images and using a model that outputs a visual depiction of the future, according to an exemplary embodiment. As shown in FIG. 12, a demonstration of how inpainting fills in and reconstructs a masked region of a portrait photograph is illustrated in the top row; and in the bottom row, a forecast region is masked in the rightmost 20% of the input image, and is filled in as shown in the output image.

Data sets for Forecasting: The experiments make use of a diverse group of data sets to help identify the strengths and weaknesses of our approach in varying applications. In an exemplary embodiment, two synthetic data sets and two real data sets have been used, with varying degrees of periodicity and complexity. The two synthetic data sets include multi-periodic data sampled from harmonic functions and mean-reverting random walk data generated following an Ornstein-Uhlenbeck process. Along with the synthetically generated data, the two real world time series data sets that have been used include one set of electrocardiogram (ECG) data and one set of historical stock price data.

Synthetic Harmonic Data: This data set is designed to be complex but with prominent, repeated signals. The time series $s_t$ is synthesized with a linearly additive two-timescale harmonic generating function, $$s_t = (A_1 + B_1 t)\sin(2\pi t/T_1 + \phi_1) + (A_2 + B_2 t)\sin(2\pi t/T_2 + \phi_2),$$

where the time t varies from t=1 to t=T, and T denotes the total length of the time series. The multiplicative amplitudes $A_1$ and $A_2$ are randomly sampled from a Gaussian distribution $N(1,0.5)$, while the amplitude of the linear trends $B_1$ and $B_2$ are sampled from a uniform distribution $U(-1/T,1/T)$. The driving time scales are short ($T_1$) and long ($T_2$) relative to the total length of T. Thus, $T_1 \sim N(T/5, T/10)$, while $T_2 \sim N(T, T/2)$. Lastly, the phase shifts $\phi_1$ and $\phi_2$ are sampled from a uniform distribution $U(0, 2\pi)$. A total of 42,188 examples were generated and used as a training set, 4,687 examples were generated and used for the validation set, and 15,625 examples were generated and used for the test set. Each time series differ concerning the possible combination of sampled parameters.

Figure 13:
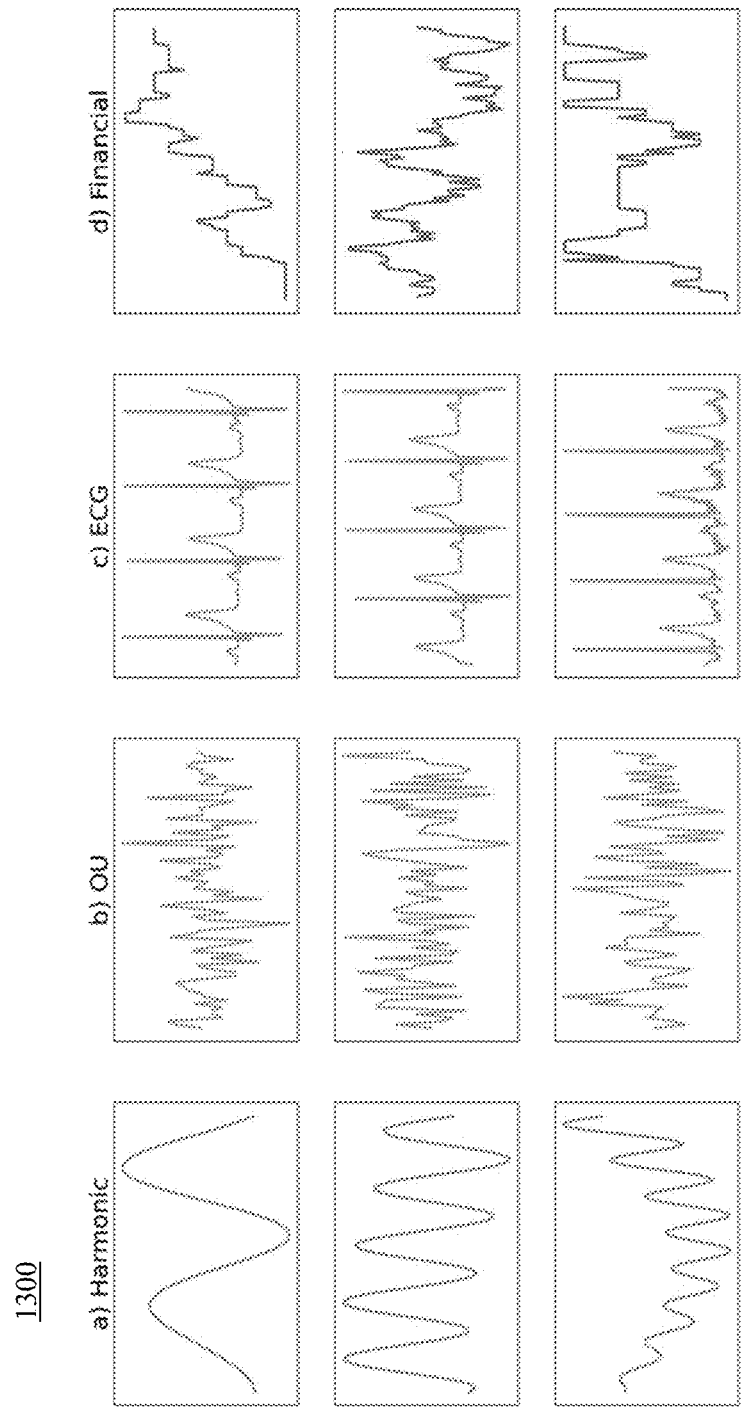
FIG. 13 is an illustration of examples of several types of time series datasets in connection with a process for implementing a method for forecasting time series by capturing input data as images and using a model that outputs a visual depiction of the future, according to an exemplary embodiment.

FIG. 13 is an illustration 1300 of examples of several types of time series datasets in connection with a process for implementing a method for forecasting time series by capturing input data as images and using a model that outputs a visual depiction of the future, according to an exemplary embodiment. Panel a) in FIG. 13 shows three examples of the harmonic data, and it is easy to see that the synthetic time series consist of two time-scales: short oscillations that are composed on much longer wave trains.

Synthetic OU Data: Mean-reverting time series data has been synthesized based on a variation of the Ornstein-Uhlenbeck (OU) process. A mean-reverting time series tends to drift towards a fundamental mean value. A choice was made to synthesize the mean reverting time series to resemble the characteristics of financial interest rates or volatility. The stochastic nature of the OU process makes it noisy on fine scales but predictable on the larger scale. In an exemplary embodiment, the OU dataset has been generated based on the following equation:

$$s_t \sim \mathcal{N}\left(\mu + (s_{t-1} - \mu)e^{-\gamma t} \cdot \frac{\sigma^2}{2\gamma}(1 - e^{-2\gamma t})\right),$$

where $\mu$ is the mean value to which the time series reverts, and so starts at $\mu$. A mean reversion rate $\gamma \sim N(8e^{-8}, 4e^{-8})$, with units $ns^{-1}$, and a volatility value $\sigma \sim N(1e^{-2}, 5e^{-3})$ were used. Overall, the time series was generated by sampling sc at every minute. A total of 45,000 examples were generated and used as a training set, 5,000 examples were generated and used for the validation set, and 15,000 examples were generated and used for the test set. Similarly as with the harmonic data, each time series differs with respect to the possible combinations of sampled parameters. Panel b) in FIG. 13 shows three samples of the OU data. One can see that the OU data tend to be noisy with uncorrelated ups and downs, but on larger scales, the data is concentrated in the middle of the image as values drift toward the mean due to its reversion constraint.

ECG data: The ECG data is measured information from 17 different people recorded from the MIT-BIH Normal Sinus Rhythm Database. A total of 18 hours of data were curated for each subject after manually examining the consistency and validity of the data by analyzing the mean and standard deviation of the time series data for each subject. For each subject, segments of 3.2 seconds corresponding to 400 data points were considered, and these segments were sampled randomly from the data. These are then down-sampled to 100 data points in order to be on par with the other data sets. 13 out of the 17 subjects are used as training and validation data, while the other 4 are used as out-of-sample test data. Overall, a total of 42,188 examples were sampled and used as a training set, 4,687 examples were sampled and used for the validation set, and 15,625 examples were sampled and used for the test set. Panel c) in FIG. 13 shows three sampled examples of the ECG data. One can see that the data has prominent periodic spikes, which makes the data predictable. However, there is noticeable noise between spikes that is much harder to predict.

Financial data: The last dataset is financial stock data. The data consists of intra-day stock prices at 6 seconds resolution, including stocks that contributed to the S&P 500 index in year 2019. For each week in year 2019, 28 time series were sampled for each stock in the S&P 500 constituents, which results in 13,412 time series samples per day. Each time series is at length of 100 data points. Taking the 2nd week of 2019 for example, there are 5 trading days, thus a total of 67,060 samples were taken for training. In the our experiments, the model was independently trained on sampled data from each week i, and then the model was tested on sampled data from week i+1. The results were averaged across the performance over all weeks in 2019. Panel d) in FIG. 13 shows three sampled examples of the financial data. Here, one can see that the data is much less predictable than the other three datasets. Although financial data is persistent with sequentially related information, it is hard to spot repeated signals that will make the data predictable. Indeed, the prevailing theory of financial markets argues that markets are very efficient, and their future movements are notoriously hard to predict, especially given price information alone.

Complexity of the Data: To provide a reference for how the time series across our data sets vary, an evaluation was made of the complexity of each data set using Weighted Permutation Entropy (WPE). The larger the WPE value, the more complex the data is. In general, more complex time series data sets are expected to be more difficult to predict.

Figure 14:
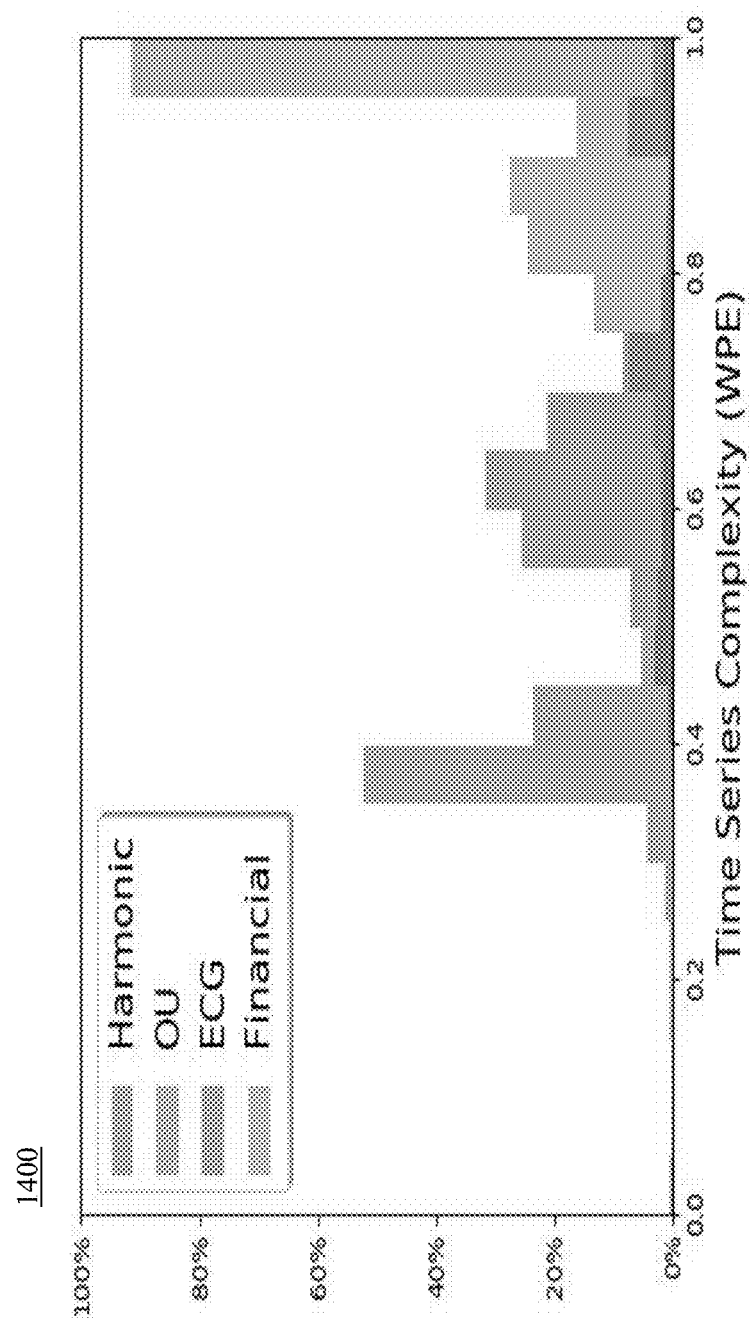
FIG. 14 is an illustration of a distribution of time series dataset complexities as measured using Weighted Permutation Entropy in connection with a process for implementing a method for forecasting time series by capturing input data as images and using a model that outputs a visual depiction of the future, according to an exemplary embodiment.

FIG. 14 is an illustration 1400 of a distribution of time series dataset complexities as measured using WPE in connection with a process for implementing a method for forecasting time series by capturing input data as images and using a model that outputs a visual depiction of the future, according to an exemplary embodiment. As shown in FIG. 14, it may be seen that the data sets cover a broad range of complexity. As expected, the simplest data is Harmonic with its deterministic periodicity. The ECG data is also periodic but more complex due to its irregularities between the spikes. The Financial data is filled with almost random movement of fine scales, therefore, more complex than both the Harmonic and ECG. The OU data exhibits even more random oscillations and abrupt changes compared to other data sets, thus it is scored as the most complex data set. However, on the larger scale, OU time series are mean reverting, and thus turn out to be somewhat predictable.

Methodology—Inpainting Implementation and Baseline Methods: In an exemplary embodiment, the PyTorch Lightning framework is used for implementation and Nvidia Tesla T4 GPUs are used in experiments. There is a 20% masked region in the input to be inpainted. Each sample contains 100 datapoints; the aim is to forecast the last 20 datapoints (i.e., the last 20%) of the input image. All metrics reported are averaged over the unseen forecast region. The proposed method is benchmarked against two baseline methods as described below.

Inpainting method. Following data preprocessing, each time series of 100 datapoints was plotted, and the image was saved in size 100×80, such that each column of the image corresponds to a point in time. To feed these images for training into the inpainting model which uses a 128×128 input layer, the image was rescaled to 128×128 pixels through bilinear interpolation. To avoid potential information leakage from the 20 datapoints in the forecast region to the past 80 datapoints, the left 80% of the image was rescaled and the right 20% of the image was rescaled separately, then the two rescaled portions of the image were concatenated together. The concatenated image is then column-wise normalized such that each column adds up to 1. The inpainting model outputs an image in size 128×128, and so it was scaled back to 100×80 for evaluations. For training, hyper-parameters were selected as follows: A batch size of 16 was used. The Adam optimizer with learning rate $\alpha=1e-4$, and exponential decay rates $\beta_1=0.5$, $\beta_2=0.999$ was used. Maximum iterations of 10,000 were allowed.

Naive method. The random walk without drift model was used as a naive numeric forecasting baseline for comparison. Specifically, this model assumes that the first difference of the time series data is not time-dependent, and follows a Gaussian distribution $N(0,\sigma)$. Given a numeric input time series $\{s_0, \ldots, s_{t-1}, s_t\}$, in order to predict $\{s_{t+1}, \ldots, s_{t+n}\}$, an estimate of $\sigma$ was made based on the following expression:

$$\sigma = \sqrt{\mathop{\mathbb{E}}_{i=1}^{t}\left[(s_i - s_{i-1})^2\right]}$$

and the prediction at future time t+k follows:

$$s_{t+k} \sim N(s_t, \sqrt{k}\sigma).$$

This results in a naive numeric forecast that simply extrapolates the last observed value into the future, with a broadening confidence interval as k increases. Thus, the corresponding visual forecast is accompanied with a growing uncertainty cone obtained through the equation above.

DeepAR method. DeepAR is a deep learning-based probabilistic forecasting method with multi-layer long short-term memory (LSTM) encoders/decoders. Each time series of 100 datapoints was preprocessed by first identifying the minimum and maximum values of the first 80 datapoints (i.e., time series history), then applying min-max transform on the complete time series including the last 20 datapoints.

A batch size of 128 was used, as was the Adam optimizer with learning rate $\alpha=1e-3$, and exponential decay rates $\beta_1=0.9$, $\beta_2=0.999$. The learning rate is reduced by a factor of 0.1 when it plateaus for 5 epochs. Training is stopped when the validation loss does not improve beyond $\alpha=1e-4$ for 15 epochs or maximum epochs of 300 is reached.

To evaluate the performance of DeepAR, a time series history $\{s_0, \ldots, s_{t-1}, s_t\}$ was inputted, then a sample $\hat{s}_{t+1}$ was taken from the output of DeepAR $N(s_{t+1},\sigma_{t+1})$. Then $\hat{s}_{t+1}$ was fed back into DeepAR for the next point, and iteratively generating predictions until the end of the prediction range (t+20 in this experiment). This prediction process was repeated to yield many sample traces representing the joint predicted distribution. These sample traces were then transformed back to the original scale of the time series. A total of 200 sample traces were generated for each test time series, and then the resulting mean and standard deviation of the samples were calculated at each predicted time point. Note that the mean of the samples was used when evaluating SMAPE and MASE metrics, and both the mean and the standard deviation of the samples were used when evaluating Likelihood and EMD metrics, as described in detail below.

Visual results: The following is a description of the performance of the various prediction algorithms in a visual or qualitative sense. Representative examples from a corpus of data have been selected to illustrate the performance of each approach.

FIG. 15 is an illustration 1500 of example out-of-sample forecast predictions using various baseline methods in connection with a process for implementing a method for forecasting time series by capturing input data as images and using a model that outputs a visual depiction of the future, according to an exemplary embodiment. Of key importance to note is that the method generates intuitive and appropriate visual forecasts of time series data using visual input only.

In this comparison, the focus is on DeepAR versus Inpainting predictions for each data set. These are the two predictions shown at the furthest right portion of FIG. 15.

Harmonic data: The Harmonic data set was intended to provide a predictable baseline. The examples are dominated by cyclic patterns. Each time series in the Harmonic dataset is a superposition of two randomly generated sinusoids. Each sinusoid exhibits cyclic patterns along with damping or magnifying trends over time. Both methods successfully predict a future harmonic series, with "blurring" indicating uncertainty. However, in this example, only Inpainting correctly predicts the phase of the future curve. This sort of error for DeepAR is common, and contributes to its lower performance in the quantitative measures as well.

OU data: It is expected that it would be difficult to predict step-wise changes in the OU data, in view of the nature of the random OU process. However, over a larger scale, the OU series has some predictability because it is a mean-reverting process. Visually, the expectation is that the majority of the future values would concentrate around the mean value of the time series with some noise. Both methods predict a rather uncertain future for the time series, which makes sense because this data is quite noisy. The Inpainting result is still somewhat better from a visual point of view because the blurred likelihood region is centered slightly higher than the prediction, in the region toward which the ground truth shows the time series moving.

ECG data: ECG time series, which represent a heartbeat over time, are periodic with intermittent spikes, and hence inherently predictable. They have relatively constant frequency and do not reflect much time dependent uncertainty. DeepAR fails to predict the next heartbeat in this series, while Inpainting identifies it quite well.

Financial data: Financial time series are possibly the most challenging to forecast amongst the four data sets. Financial data is close to random on short scales and shows no apparent periodicity on large scales. In this example, DeepAR commits to a downward trending prediction, while Inpainting more correctly predicts horizontal movement. Of interest in the Inpainting result are several horizontal bands, suggesting a multi-modal likelihood prediction. Note that the ground truth series does indeed linger in two of these projected regions. Inpainting may be the only method that is able to make such multimodal predictions.

Figure 16:
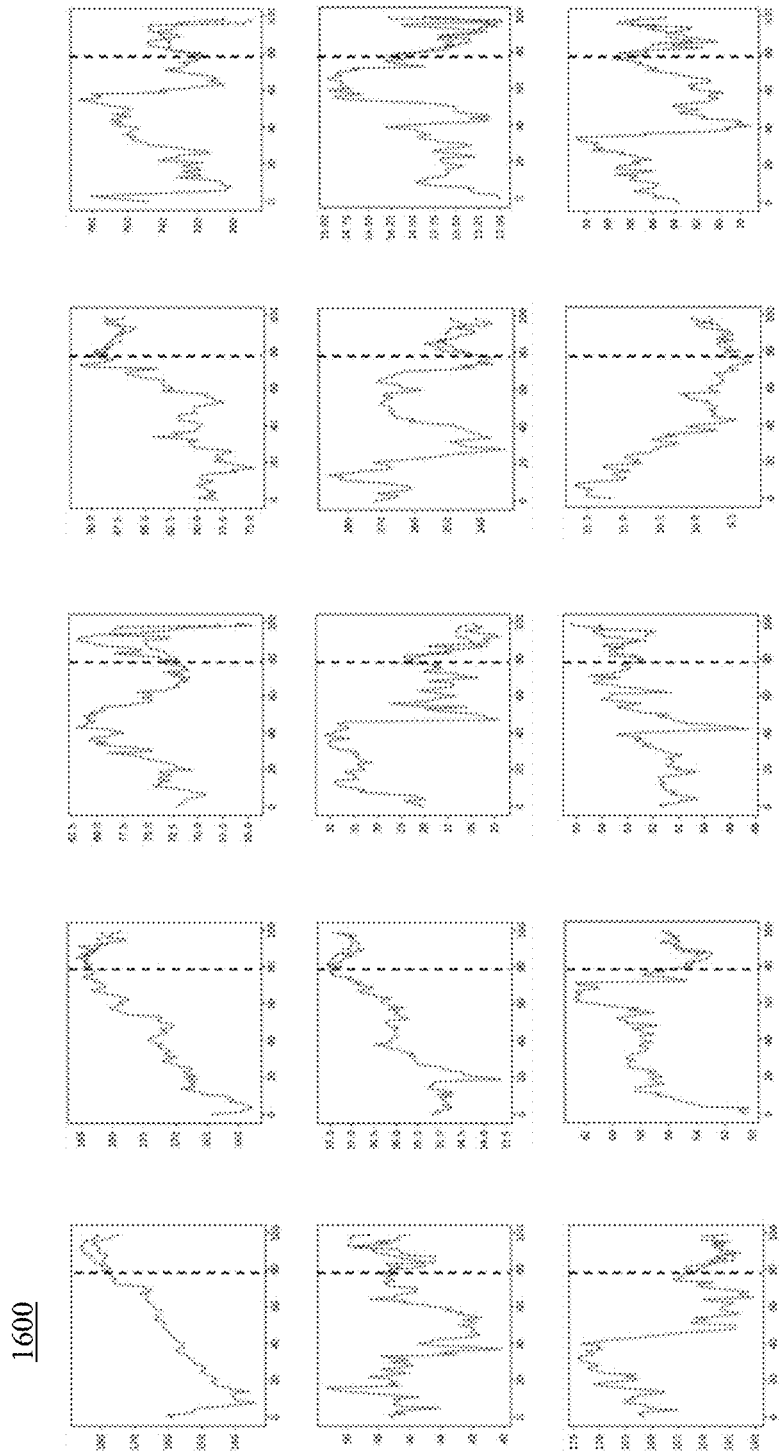
FIG. 16 and FIG. 17 are illustrations of example out-of-sample forecast predictions of financial time-series data generated by executing a process for implementing a method for forecasting time series by capturing input data as images and using a model that outputs a visual depiction of the future, according to an exemplary embodiment.
Figure 17:
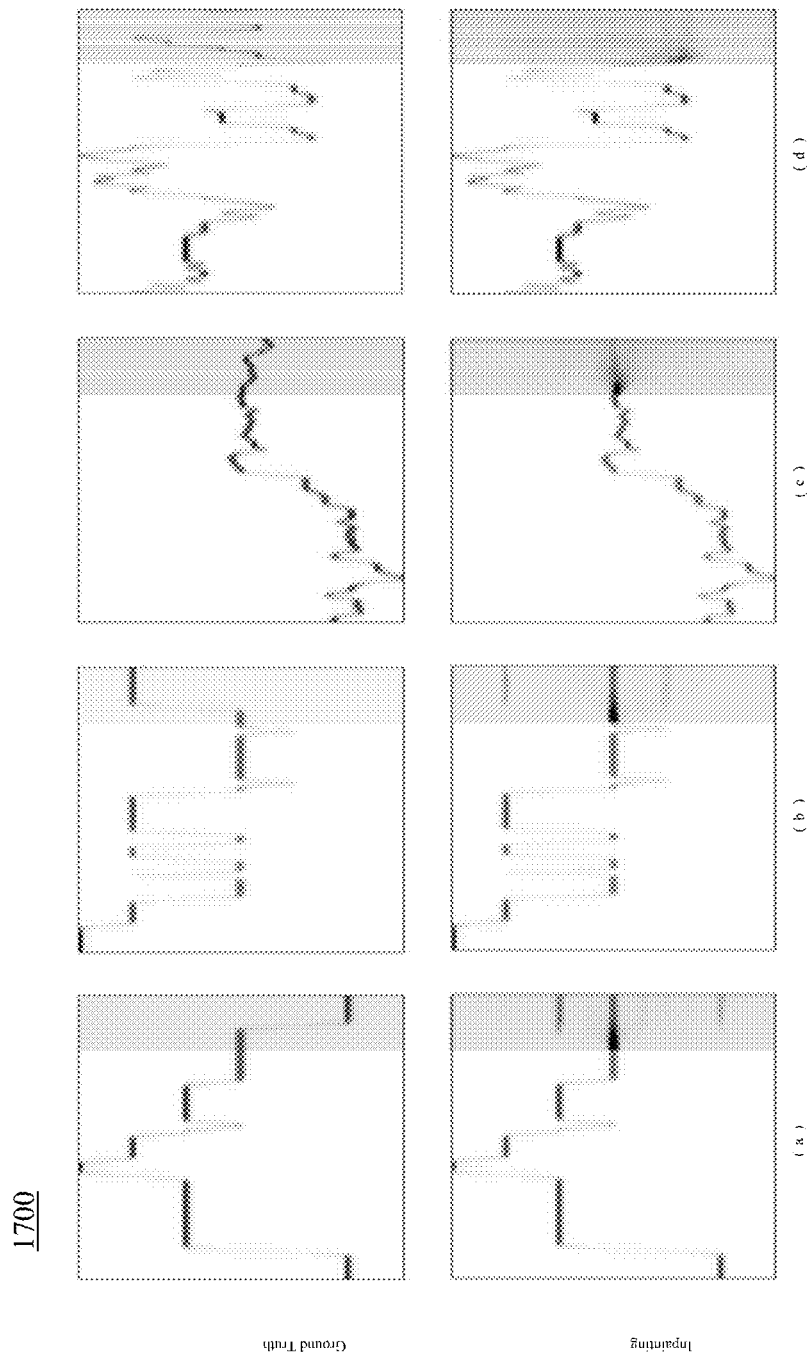

FIG. 16 and FIG. 17 are illustrations 1600, 1700 of example out-of-sample forecast predictions of financial time-series data generated by executing a process for implementing a method for forecasting time series by capturing input data as images and using a model that outputs a visual depiction of the future, according to an exemplary embodiment.

In FIG. 16, illustration 1600 shows point-wise forecasts for daily prices for stocks selected from the S&P 500 index. The vertical line indicates the point at which the forecast begins. The prediction at each point is selected using the highest-valued pixel in that column.

In FIG. 17, illustration 1700 focuses on the probabilistic capabilities of the approach by showing the predictions as images. Note that for example time series that exhibit step-wise movements in the input, the forecast includes a multi-modal likelihood prediction, with the modes corresponding to the location of the steps in the input. In the case of more continuous inputs (e.g., columns (c) and (d)), continuous or blurry forecasts are seen.

Methodology—Forecast Accuracy Metrics: In an exemplary embodiment, a variety of metrics may be used to assess the accuracy of forecast predictions of each method. Symmetric Mean Absolute Error (SMAPE) and Mean Absolute Scaled Error (MASE) are included as numeric forecast metrics, as they are extensively used in the time series forecasting literature.

SMAPE and MASE are standard methods for assessing time series forecasts, but they are limited because they do not provide a means for evaluating visual forecasts. In particular, visual forecasts can encode an implicit prediction of likelihood distributions, which our Inpainting method supports. Accordingly, two additional visual forecast metrics are introduced: namely, Likelihood and Earth Mover Distance (EMD), adopted from the statistics and machine learning fields and applied to image-based forecasts.

The baseline methods Naive and DeepAR produce numeric forecasts, whereas the Inpainting method produces an image as a visual forecast. When evaluating numeric forecast metrics given visual forecasts, the index of the pixel with the highest intensity is taken in each predicted image column, then this index is converted back to the original time series scale as the point forecast. When evaluating visual forecast metrics given numeric forecasts, the numeric forecasts are transformed into images using a process as described above. When the numeric forecast is probabilistic, the intensity of each pixel is computed in an image column as the cumulative probability within the numeric interval that pixel represents.

The SMAPE metric is a widely used measure of forecast accuracy. It is calculated as:

$$SMAPE = \frac{1}{n} \sum_{i=t+1}^{t+o} \frac{|y_i - \hat{y}_i|}{(|y_i| + |\hat{y}_i|)/2}$$

where $\hat{y}_i$ is the forecast, $y_i$ is the corresponding observed ground-truth, and n is the length of the forecast time series. The error ranges from 0.0 to 2.0, with lower values indicating better forecasts.

The MASE metric is another commonly used measure of forecast accuracy. It is the mean absolute error of the forecast divided by the mean absolute error of naive one-step forecast on the in-sample data, calculated as $$MASE = \frac{\frac{1}{n}\sum_{n=i+1}^{t+n} |y_i - \hat{y}_i|}{\frac{1}{n}\sum_{i=1}^{t} |y_i - y_{i-1}|}$$

Errors less than one (1) imply that the forecast performs better than the naive one-step forecast calculated on the in-sample data. Lower errors indicate better predictions. Note that MASE become unstable when the denominator approaches zero (0).

Figure 18:
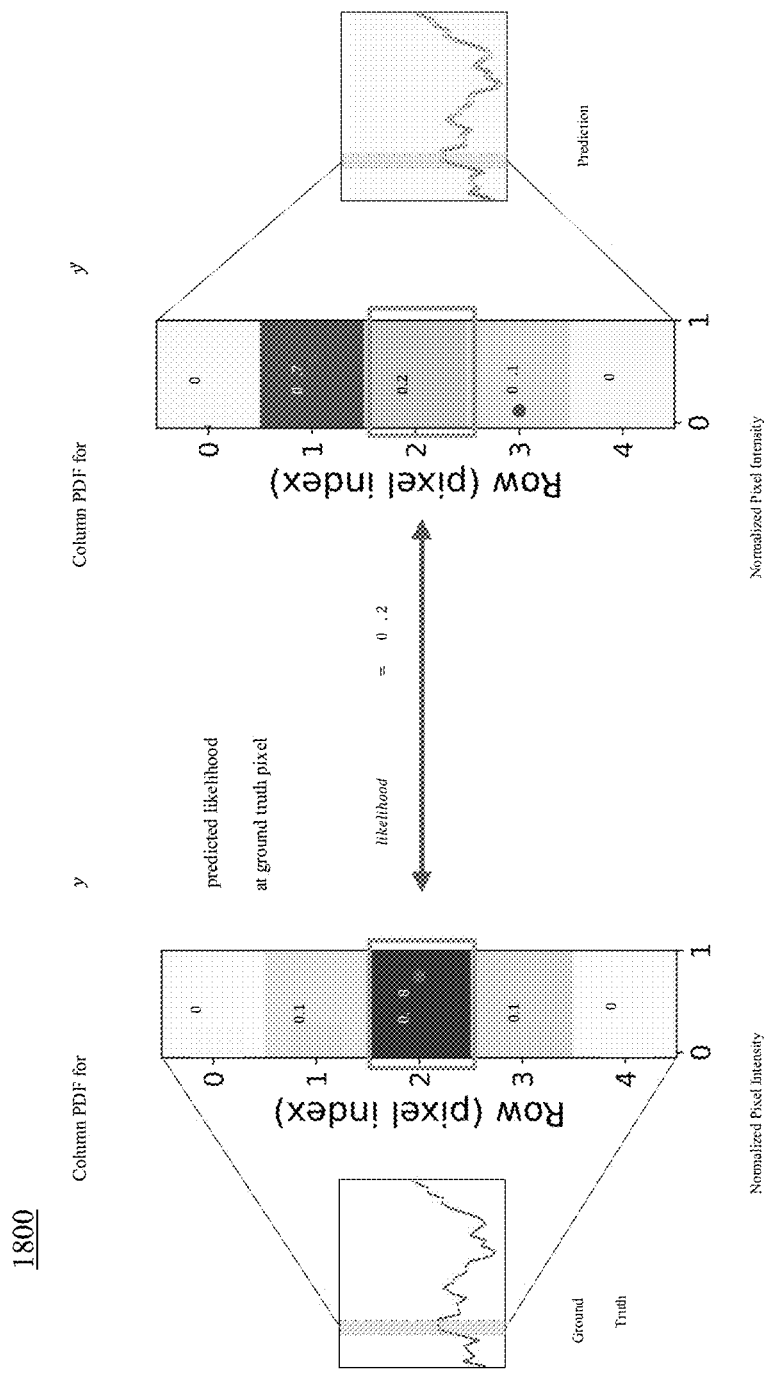
FIG. 18 is an illustration of a likelihood metric that indicates a measurement of forecast accuracy in connection with a process for implementing a method for forecasting time series by capturing input data as images and using a model that outputs a visual depiction of the future, according to an exemplary embodiment.

FIG. 18 is an illustration 1800 of a likelihood metric that indicates a measurement of forecast accuracy in connection with a process for implementing a method for forecasting time series by capturing input data as images and using a model that outputs a visual depiction of the future, according to an exemplary embodiment. The Likelihood metric is used to evaluate the performance of a visual forecast, as illustrated in FIG. 18. From the ground-truth image on the left, for each image column in the forecast region, the ground truth pixel is identified as the pixel with the highest intensity. Then the predicted likelihood of the pixel is measured as the intensity of the corresponding pixel in the predicted image column. Higher likelihood values indicate better forecasts.

The Earth Mover Distance (EMD) metric: The EMD metric is a measure of the distance between two probability distributions. Similar to Likelihood, EMD was used to evaluate the performance of a visual forecast. Each column in the inpainted image is treated as a probability distribution, and the corresponding column in the ground-truth image is treated as a probability distribution as well. Then the EMD metric is calculated as the minimum cost of turning one distribution to the other. The EMD value ranges from 0 to 1, with lower values indicating better forecasts.

Quantitative results: The metrics described above are usable for assessing the prediction algorithms across all four data sets. All reported metrics are evaluated over the unseen future prediction region. For both Inpainting and DeepAR, these metrics were averaged over four independently trained models with different random weight initializations.

The mean and standard deviation of various prediction accuracy metrics are reported below in Table I. Lower SMAPE and MASE values indicate better prediction accuracy. Note that the Inpainting method performs as well as or statistically better than the baseline methods for all data sets when evaluated using SMAPE or MASE.

It has been found that SMAPE and MASE are not effective at distinguishing the advantage of one method over the other for some of the data sets, especially for financial data. However, visual forecast metrics such as Likelihood and EMD enable comparisons of visual forecasts. Both visual forecast metrics act as image-based probabilistic forecast metrics, at each time point evaluating the predicted distribution instead of a point forecast.

TABLE I

| | Method | SMAPE $\mu \pm \sigma$ | MASE $\mu \pm \sigma$ |
|---|---|---|---|
| Harmonic | Naive | 1.238 ± 0.441 | 5.235 ± 3.853 |
| | DeepAR | 1.154 ± 0.291 | 4.146 ± 3.089 |
| | Inpainting | 0.815 ± 0.334 | 3.091 ± 2.460 |
| OU | Naive | 0.018 ± 0.069 | 1.014 ± 0.405 |
| | DeepAR | 0.014 ± 0.056 | 0.729 ± 0.213 |
| | Inpainting | 0.019 ± 0.071 | 1.040 ± 0.491 |
| ECG | Naive | 1.173 ± 0.463 | 1.538 ± 1.302 |
| | DeepAR | 0.966 ± 0.268 | 0.936 ± 0.388 |
| | Inpainting | 0.721 ± 0.306 | 0.825 ± 0.496 |
| Financial | Naive | 4.01e−4 ± 0.002 | 5.169 ± 16.955 |
| | DeepAR | 4.64e−4 ± 0.002 | 6.006 ± 18.117 |
| | Inpainting | 4.27e−4 ± 0.002 | 5.490 ± 16.975 |

TABLE II

| | Method | Likelihood $\mu \pm \sigma$ | EMD $\mu \pm \sigma$ |
|---|---|---|---|
| Harmonic | Naive | 0.077 ± 0.060 | 0.209 ± 0.073 |
| | DeepAR | 0.034 ± 0.010 | 0.195 ± 0.040 |
| | Inpainting | 0.181 ± 0.088 | 0.119 ± 0.044 |

TABLE II-continued

| | Method | Likelihood $\mu \pm \sigma$ | EMD $\mu \pm \sigma$ |
|---|---|---|---|
| OU | Naive | 0.174 ± 0.141 | 0.211 ± 0.025 |
| | DeepAR | 0.023 ± 0.005 | 0.123 ± 0.025 |
| | Inpainting | 0.309 ± 0.219 | 0.107 ± 0.025 |
| ECG | Naive | 0.071 ± 0.097 | 0.207 ± 0.028 |
| | DeepAR | 0.073 ± 0.045 | 0.091 ± 0.074 |
| | Inpainting | 0.655 ± 1.037 | 0.052 ± 0.016 |
| Financial | Naive | 0.103 ± 0.161 | 0.163 ± 0.073 |
| | DeepAR | 0.025 ± 0.009 | 6.006 ± 18.117 |
| | Inpainting | 0.199 ± 0.295 | 0.163 ± 0.065 |

Harmonic Data: The Naive method can only learn time independent stepwise volatility changes, and thus cannot predict cyclic patterns. Both Inpainting and DeepAR capture the cyclic patterns, with Inpainting being more accurate according to Table I. All four metrics illustrate the advantage of the proposed Inpainting method for this data set.

OU Data: For this data set, the MASE and SMAPE metrics appear to be non-informative, as neither can distinguish between the performance of the methods when treating the forecasts as point predictions. However, the complexities of these forecasts are appropriately assessed in the Likelihood and EMD metrics, according to which Inpainting performs significantly better. This is also reflected in FIG. 15, where it may be seen that Inpainting apparently models the hidden mean value, and was also able to partially recover the range of the noise—unlike the other baselines, which typically overestimate the uncertainty of the noise.

ECG Data: The qualitative analysis, as illustrated in FIG. 15, shows that Inpainting is able to capture these cyclic patterns well. As evidenced by all quantitative metrics, Inpainting is able to handle this sort of periodic data with sharp and abrupt changes, and better recovers the heart beat spikes as compared to other methods.

Financial Data: FIG. 15 shows that, similar to the OU predictions, DeepAR predicted the future with a weak linear trend, while Inpainting outperformed with a prediction that captures the multi-modal distribution of the future. Again, similar to the OU dataset, both MASE and SMAPE metrics cannot disambiguate the performance of the benchmarked methods when treating the forecasts as point forecasts, while image-based probabilistic metrics Likelihood and EMD evaluate Inpainting as performing the best.

Accordingly, with this technology, an optimized process for forecasting time series by capturing input data as images and using a model that outputs a visual depiction of the future is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for using images that represent time-series data to forecast corresponding images depicting future values of the time-series data, the method being implemented by at least one processor, the method comprising:
  receiving, by the at least one processor, a first set of time-series data;
  converting, by the at least one processor, the first set of time-series data into a partial first image that includes at least one blank region to which future data to be included in the first set of time-series data corresponds; and
  performing an inpainting operation with respect to the partial first image by generating a plurality of pixels for filling in the at least one blank region in order to produce an augmented version of the first image,
  wherein the method further comprises:
  receiving a plurality of training sets of time-series data;
  converting each respective one of the plurality of training sets of time-series data into a corresponding one of a plurality of training images;
  training, by using the plurality of training images, a machine learning algorithm that is designed to perform the inpainting operation; and
  executing the machine learning algorithm by using the plurality of training images in conjunction with the partial first image to perform the inpainting operation,
  wherein the training is performed by using a batch size of 16, an Adams optimizer with learning rate $\alpha=0.0001$, a first exponential decay rate $\beta_1=0.5$, and a second exponential decay rate $\beta_2=0.999$, and
  wherein the first set of time-series data includes at least one from among a synthetic harmonic dataset, a synthetic mean-reverting dataset that is generated by using an Ornstein-Uhlenbeck (OU) process, and a set of electrocardiogram (ECG) data.

2. The method of claim 1, further comprising using the augmented first image to generate a second image depicting a plurality of future values that corresponds to a predetermined future time interval with respect to the first set of time-series data.

3. The method of claim 1, further comprising determining, for each respective pixel included in the plurality of pixels, a respective probability that indicates a corresponding uncertainty with respect to an accuracy of the respective pixel.

4. The method of claim 3, wherein the generating of the plurality of pixels comprises representing, for each respective pixel, the corresponding uncertainty by using a pixel intensity of the respective pixel.

5. The method of claim 1, further comprising generating at least one metric that relates to a forecast accuracy of the augmented first image.

6. The method of claim 5, wherein the at least one metric includes an Earth Mover's Distance (EMD) metric.

7. A computing apparatus for using images that represent time-series data to forecast corresponding images depicting future values of the time-series data, the computing apparatus comprising:
a processor;
a memory; and
a communication interface coupled to each of the processor and the memory, wherein the processor is configured to:
receive, via the communication interface, a first set of time-series data;
convert the first set of time-series data into a partial first image that includes at least one blank region to which future data to be included in the first set of time-series data corresponds; and
perform an inpainting operation with respect to the partial first image by generating a plurality of pixels for filling in the at least one blank region in order to produce an augmented version of the first image, wherein the processor is further configured to:
receive, via the communication interface, a plurality of training sets of time-series data;
convert each respective one of the plurality of training sets of time-series data into a corresponding one of a plurality of training images;
train, by using the plurality of training images, a machine learning algorithm that is designed to perform the inpainting operation; and
execute the machine learning algorithm by using the plurality of training images in conjunction with the partial first image to perform the inpainting operation,
wherein the training is performed by using a batch size of 16, an Adams optimizer with learning rate $\alpha=0.0001$, a first exponential decay rate $\beta_1=0.5$, and a second exponential decay rate $\beta_2=0.999$, and
wherein the first set of time-series data includes at least one from among a synthetic harmonic dataset, a synthetic mean-reverting dataset that is generated by using an Ornstein-Uhlenbeck (OU) process, and a set of electrocardiogram (ECG) data.

8. The computing apparatus of claim 7, wherein the processor is further configured to use the augmented first image to generate a second image depicting a plurality of future values that corresponds to a predetermined future time interval with respect to the first set of time-series data.

9. The computing apparatus of claim 7, wherein the processor is further configured to determine, for each respective pixel included in the plurality of pixels, a respective probability that indicates a corresponding uncertainty with respect to an accuracy of the respective pixel.

10. The computing apparatus of claim 9, wherein the processor is further configured to generate the plurality of pixels such that for each respective pixel, the corresponding uncertainty is represented by using a pixel intensity of the respective pixel.

11. The computing apparatus of claim 7, wherein the processor is further configured to generate at least one metric that relates to a forecast accuracy of the augmented first image.

12. The computing apparatus of claim 11, wherein the at least one metric includes an Earth Mover's Distance (EMD) metric.

13. A non-transitory computer readable storage medium storing instructions for using images that represent time-series data to forecast corresponding images depicting future values of the time-series data, the storage medium comprising executable code which, when executed by a processor, causes the processor to:
receive a first set of time-series data;
convert the first set of time-series data into a partial first image that includes at least one blank region to which future data to be included in the first set of time-series data corresponds; and
perform an inpainting operation with respect to the partial first image by generating a plurality of pixels for filling in the at least one blank region in order to produce an augmented version of the first image, wherein when executed by the processor, the executable code further causes the processor to:
receive a plurality of training sets of time-series data;
convert each respective one of the plurality of training sets of time-series data into a corresponding one of a plurality of training images;
train, by using the plurality of training images, a machine learning algorithm that is designed to perform the inpainting operation; and
execute the machine learning algorithm by using the plurality of training images in conjunction with the partial first image to perform the inpainting operation, wherein the training is performed by using a batch size of 16, an Adams optimizer with learning rate $\alpha=0.0001$, a first exponential decay rate $\beta_1=0.5$, and a second exponential decay rate $\beta_2=0.999$, and wherein the first set of time-series data includes at least one from among a synthetic harmonic dataset, a synthetic mean-reverting dataset that is generated by using an Ornstein-Uhlenbeck (OU) process, and a set of electrocardiogram (ECG) data.

* * * * *